US008700522B2

(12) United States Patent
Moore et al.

(10) Patent No.: US 8,700,522 B2
(45) Date of Patent: Apr. 15, 2014

(54) LOAN PORTFOLIO MANAGEMENT TOOL

(75) Inventors: Terry L. Moore, Atlanta, GA (US);
Omer Sohail, Keller, TX (US); Ghazale Johnston, Charlotte, NC (US); Andrew J. Martinson, Concord, NC (US)

(73) Assignee: Accenture Global Services Limited, Dublin (IE)

( * ) Notice: Subject to any disclaimer, the term of this patent is extended or adjusted under 35 U.S.C. 154(b) by 275 days.

(21) Appl. No.: 12/912,909

(22) Filed: Oct. 27, 2010

(65) Prior Publication Data
US 2011/0106692 A1 May 5, 2011

Related U.S. Application Data

(60) Provisional application No. 61/256,733, filed on Oct. 30, 2009.

(51) Int. Cl.
*G06Q 40/00* (2012.01)
*G06Q 40/02* (2012.01)

(52) U.S. Cl.
CPC .................................. *G06Q 40/02* (2013.01)
USPC ................... 705/38; 705/35; 705/36

(58) Field of Classification Search
USPC ................................................. 705/30–45
See application file for complete search history.

(56) References Cited

U.S. PATENT DOCUMENTS

| 6,998,082 | B2 * | 2/2006 | Yang .............................. 264/156 |
| 7,050,999 | B1 * | 5/2006 | Ota .................................. 705/37 |
| 7,933,796 | B1 * | 4/2011 | Buist et al. ................... 705/7.28 |
| 2002/0116303 | A1 * | 8/2002 | Hayashi .......................... 705/35 |
| 2004/0030629 | A1 * | 2/2004 | Freeman et al. ................. 705/36 |
| 2004/0267660 | A1 * | 12/2004 | Greenwood et al. ............ 705/38 |
| 2006/0059073 | A1 * | 3/2006 | Walzak .............. 705/35 |
| 2007/0033123 | A1 * | 2/2007 | Navin ............................. 705/35 |
| 2009/0099957 | A1 * | 4/2009 | Abhyankar et al. ............ 705/38 |
| 2009/0164232 | A1 * | 6/2009 | Chmielewski et al. ........... 705/1 |
| 2009/0299911 | A1 * | 12/2009 | Abrahams et al. .......... 705/36 R |

OTHER PUBLICATIONS

Moore, Terry et al., Navigating the New Wave of Loan Modifications, May 22, 2009, pp. 1-2, SourceMedia Inc. and American Banker, New York.

* cited by examiner

*Primary Examiner* — Tien Nguyen
(74) *Attorney, Agent, or Firm* — Brinks Gilson & Lione

(57) ABSTRACT

A loan portfolio manager system is provided to predict and prioritize loans at risk of default and foreclosure. The loan portfolio manager system may analyze the loans at risk to determine which of the loans are at risk and also candidates for modification. The loan portfolio manager system may generate recommended modification solutions for those at risk loans by applying configurable criteria and data analytics. The loan portfolio manager system may monitor and report on the health of loan portfolios, borrowers, and on success of loan modifications. The loan portfolio manager system may facilitate loan modification business process outsourcing through campaign management and buyer contact/interaction capabilities.

22 Claims, 34 Drawing Sheets

| Portfolio Reports | 402 |
|---|---|
| Watchlists | 404 |
| Risk Rankings | 406 |
| NPV Threshold Values | 408 |
| Customer Contact List | 410 |
| Loan Performance Statistics | 412 |
| Forecasted Scenarios | 414 |
| Regional Performance Statistics | 416 |
| Campaign Results | 418 |

FIG. 4

| Portfolio Monitoring Results | 502 |
|---|---|

| Credit Capacity Index Updates | 504 |
|---|---|
| Borrower LPM Index Updates | 506 |
| NPV Threshold Values Updates | 508 |
| Customer Contact List Updated | 510 |
| Revised Loan Performance Statistics | 512 |
| Monitored Results for Forecasted Scenarios | 514 |
| Regional Performance Statistics Updates | 516 |
| Customer Contact Campaign Refinements | 518 |
| Investor Terms Performance Analysis | 520 |

FIG. 5

| Portfolio Analytics | 1402 |
|---|---|
| Credit Capacity Index | 1404 |
| Borrower LPM Index Updates | 1406 |
| Priority Ranking | 1408 |
| Portfolio Analytics Descriptions | 1410 |
| Refresh Frequency | 1412 |
| Current Loan Servicer Capability | 1414 |
| Remediation Benefit Analysis | 1416 |
| Risk - Capacity Analysis | 1418 |
| Borrower Demographics | 1420 |
| Borrower Performance Uplift | 1422 |

Segment Analysis
- Design segmented campaigns to maximize contact with the borrower and encourage default resolution actions by the borrower
- Campaigns are created to target various segments of borrowers identified either by the customer (via self directed portal) or through the. Customers are then contacted according to the campaign guidelines.

BPO Support
- Perform outbound calls to all customers identified for a specific campaign
- The outbound call center establishes contact with borrowers to ensure open communication during the default mitigation process. Borrowers are entered into campaigns appropriate for their situation

Tools
- Design and implement advanced campaign management tools:
  - Self directed customer portal for initial contact and data collection
  - Ongoing metric monitoring and reporting on campaign success to identify successful strategies and identify trends

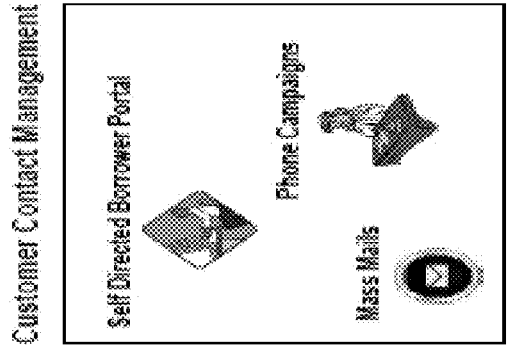

FIG. 33

LOAN PORTFOLIO MANAGEMENT TOOL

This application claims priority under 35 U.S.C. §119(e) to U.S. Provisional Application No. 61/256,733, entitled "LOAN PORTFOLIO MANAGEMENT TOOL," filed Oct. 30, 2009, the entire contents of which are incorporated by reference.

BACKGROUND OF THE INVENTION

1. Technical Field

This disclosure relates to a system and method to avoid loan defaults and foreclosures. In particular, this disclosure relates to a system and method to forecast and prioritize loans that are at risk of default and/or foreclosure, develop and execute loss mitigation campaigns using distributed resources, and provide recommendations to borrowers to transform at risk loans into performing loans.

2. Background Information

Currently, the mortgage industry faces unprecedented challenges in an effort to address a historically high number of loan defaults and foreclosures. Currently the mortgage industry reports that many borrowers are in foreclosure proceedings and the borrowers have had no contact with their servicer. A sampling of current mortgage industry loan portfolios suggests that few of the borrowers have workout plans in progress. Programs were designed to keep many troubled homeowners in their homes, but typically few applications are received and the applications received failed to meet the programs guidelines and therefore were rejected. Millions of homeowners could end up defaulting on their mortgages in the near future. The pace of loan modifications is slow. Loan modifications may occur for a small percentage of seriously delinquent loans each month.

Mortgage default estimates are considerable in an economic climate of high and growing rates of default and foreclosure. Foreclosure cost estimates under such economic conditions are great. Many families typically lose their homes during such economic conditions. Recidivism rates for loan defaults and foreclosures rise. Regulatory mandates may be expected to force lenders and loan servicers to modify performing loans in order to assist borrowers under such economic conditions.

Bank and loan servicer financial impacts due to poorly serviced loans include: 1) Rise in mortgage default rate with many of the defaulting loans going to foreclosure, resulting in a unprecedented foreclosure rate across the industry; 2) expected re-default rate, in such economic climate, on modified mortgages (using existing processes and tools) has been more than a third of the defaults re-defaulting; and 3) the cost of a foreclosure to the bank, loan servicer and investor yield foreclosure related costs across the industry. Borrower and other consumers impacts due to poorly serviced loans include: 1) higher defaults on other accounts (e.g., credit cards, auto loans); and 2) loss of home equity through foreclosures and short sales.

Therefore, a need exists to address the problems noted above and other problems previously experienced.

SUMMARY

In one aspect, a Loan Portfolio Management system may: (1) predict and prioritize loans at risk of default and foreclosure that are candidates for loan modification; (2) recommend modification solutions for those at risk of default by applying configurable criteria and/or through the use of data analytics; (3) monitor and report on portfolio and borrower level "health" including success of applied loan modifications. In a second aspect, the Loan Portfolio Management system may facilitate loan modification BPO (Business Process Outsourcing) through campaign management and buyer contact/interaction capabilities.

The Loan Portfolio Management system may: (1) receive current borrower and macro economic data against a loan servicer portfolio; (2) identify and prioritize borrower candidates for loan modification to prevent loan default and/or foreclosure; (3) recommend a set of one to many modification solutions that minimize the modification cost to the servicer and maximize the probability of keeping the borrower out of foreclosure; and (3) monitor, manage and report on the portfolio risk profile through a series of executive dashboards on a daily basis.

The Loan Portfolio Management system may facilitate loan modification business process outsourcing (BPO) by providing skills and capacity to assist servicers in executing loan modifications. The servicer may include an optional borrower contact capability.

One misconception is that restructuring loans violates the contractual rights of investors. Streamlined restructuring is a strategy that may be pursued voluntarily by servicers in the interest of investors under existing PSA agreements (Pooling and Servicing Agreements). PSA agreements describe how pooled commercial loans will be serviced and dictate how proceeds and losses will be distributed to bondholders (investors). The significant deterioration seen in mortgage credit performance and the housing market indicates that the restructuring strategy may be a means to maximize the total net present value of securitized subprime mortgages. Given that maximizing the total net present value is the legal mandate of servicers, servicers have begun to embrace the restructuring strategy more often as conditions have worsened. As long as restructuring is chosen voluntarily by servicers under the servicers' existing PSAs, and as long as the servicers can demonstrate that the servicers' strategies are to maximize the proceeds of the pool, restructuring the loans in the portfolio probably does not represent a violation of the investors' contractual rights.

Accordingly, the Loan Portfolio Management system may address (1) the lack of current borrower data, (2) the lack of sophisticated data analytics, (3) the lack of comprehensive and daily portfolio management capability, (4) the limited borrow contact capability, and (5) limited skills and resource capacity. For example the systems may retrieve current data, apply sophisticated analytics, organize and report on data, provide "what if analysis", learn over time to enhance default predictability, and apply capacity, industrialization, process maturity. Thus, the systems may significantly reduce default and foreclosure rates and costs benefiting servicers, borrowers, and the country.

The systems may benefit the servicer/investor by reducing servicer default rates and costs through intelligent modifications (i.e., reduced foreclosure costs and reduced modification costs). The systems may facilitate more focused loss mitigation campaigns prior to making borrower contact. The systems may further provide a "relief-valve" for resources to address the mounting loan modification backlog.

Millions of families may remain in their homes and have affordable mortgages. Homeowners may maintain current credit scores as loan modifications do not result in an adverse credit profile notification. In one example, the system may provide workout options for all of a borrower's debt obligations and not just the borrower's mortgage. Faster resolution of default situation may result in a higher probability of a "one-time fix".

A tool may collect data into a lending data warehouse. The data may include (1) fresh borrower data, such as income; (2) loan system data and investor terms; (3) macroeconomic data; and (4) property valuation data. An analytics engine may analyze the data in the lending data warehouse to prepare a prioritized list of loans based on default probability. The analytics engine may further recommended remediation strategy based on determined goals such as default probability avoidance, servicer costs, investor impacts and net present value (NPV) analysis.

The Loan Portfolio Management (LPM) system may adjust the effect of comparing dissimilar borrower profiles as a result of regulatory and market changes. When regulatory changes occur, the statistical similarities between borrowers in a loan portfolio may change. Market changes include changes to contract terms and obligations between investors and loan servicers.

Benefits to banks and servicers may include, for example: (1) 3-4% reduction in an overall expected default rate across the industry through better insights and optimal modification offers—causing a resultant 1-2% reduction in the 5% foreclosure rate; and (2) industry-wide, this represents a potential foreclosure cost savings of ~$30-50 B (~$13-$22 B when looking at strictly operational costs).

Reducing foreclosures will help stabilize falling home prices because "same street" foreclosures immediately drive property values down by about 1-5%. Stabilizing falling home prices may benefit the national economy.

Other systems, methods, features and advantages will be, or will become, apparent to one with skill in the art upon examination of the figures and detailed description. All such additional systems, methods, features and advantages are included within this description, are within the scope of the claimed subject matter, and are protected by the following claims.

BRIEF DESCRIPTION OF THE DRAWINGS

The system may be better understood with reference to the following drawings and description. The elements in the figures are not necessarily to scale, emphasis instead being placed upon illustrating the principles of the system. In the figures, like-referenced numerals designate corresponding parts throughout the different views.

FIG. 4 illustrates sample portfolio reports.

FIG. 5 illustrates example portfolio monitoring results.

FIG. 14 illustrates example portfolio analytics.

FIG. 25 illustrates example LPM analytics and metrics.

FIG. 30 illustrates an example chief executive officer dashboard.

FIG. 33 illustrates customer contact management process components.

DETAILED DESCRIPTION

Figure 1:
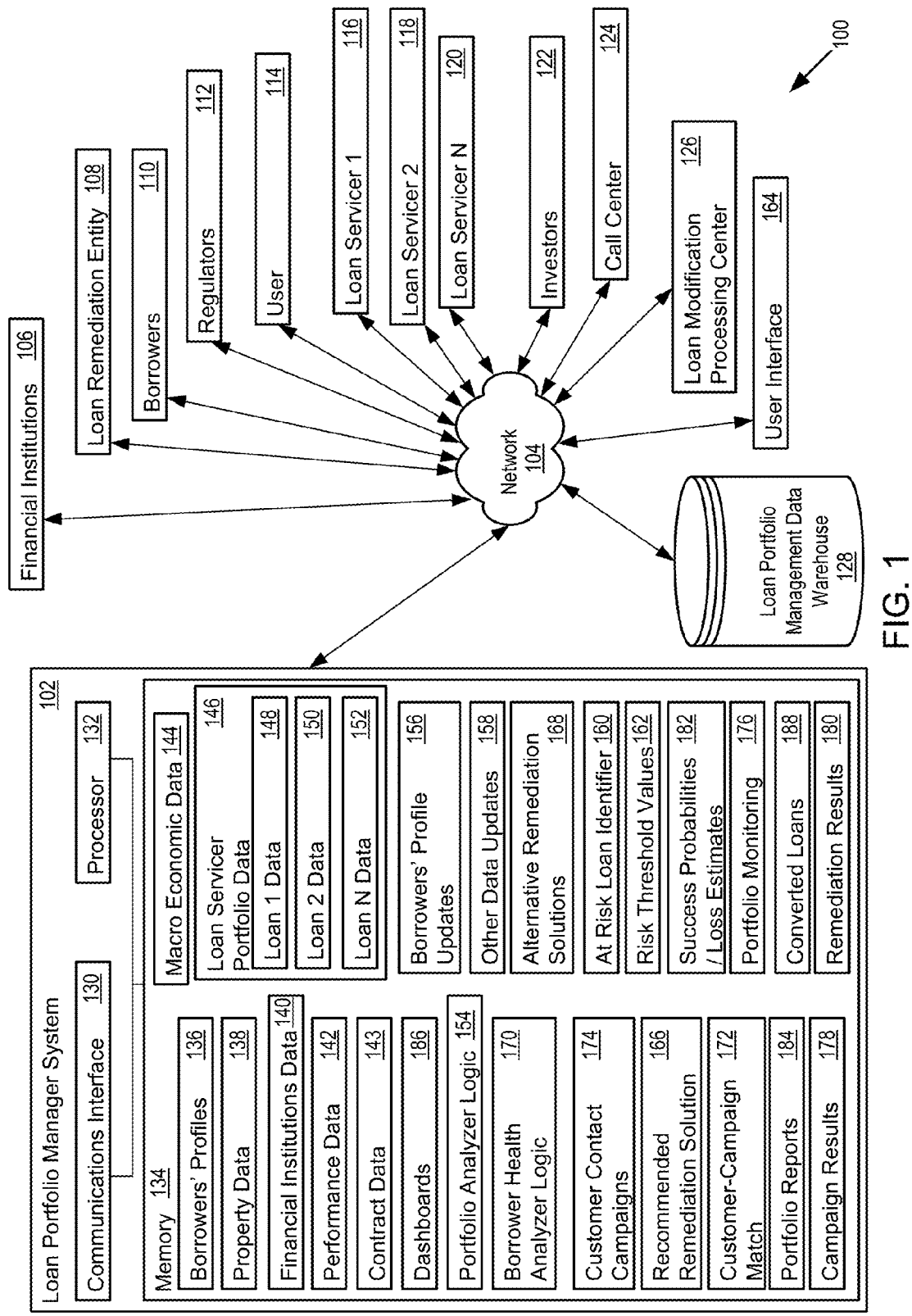
FIG. 1 illustrates an example of a loan portfolio manager (LPM) system configuration.

Many loan servicers and mortgage backed securities investors lack the data, analytics, portfolio management and reporting capabilities necessary to adequately forecast loan defaults and foreclosures. Loan servicers and investors also lack the tools and expertise necessary to design and/or identify loan remediation recommendations intended to avoid defaults and foreclosures. Additionally, many loan servicers and investors also lack the tools and expertise necessary to minimize costs to the loan servicers in servicing loans.

Current systems fail to analyze macro-economic conditions and data such as upward pricing of hybrid adjustable rate mortgages, rising rate of unemployment and underemployment, ongoing decreases in property values in order to properly analyze normalized borrowers and loan portfolios. Current systems also fail to analyze borrowers and loan portfolios by adjusting for the spread between agency bonds and treasury bonds, which may indicate that fewer refinancing options are available, and prioritize remediation recommendations accordingly.

In particular, current industry systems' limitations include the following: (1) LTV (loan-to-value) is being misrepresented in portfolio analytics as changes in collateral data are not readily available; (2) changes in borrower's income and employment status are unknown or not reported in timely manner to loan servicers which is preventing many at-risk loans from being flagged for scrutiny; (3) no automated and cohesive way exists to promptly report analysis and receive updates of various data regarding the borrowers' profiles and loan data for each loan of a group of loan portfolios; (4) limited forward thinking analytics; and (5) limited ability to analyze loans and provide modification offers on an industrialized scale.

Current industry systems rely on stale borrower data. Loan servicers rely on stale income, employment and asset information which is rarely or never refreshed after being collected. Credit bureau data, for example, is often only refreshed quarterly. Current industry systems lack current real-time property data. Loan servicers often use stale and/or inaccurate property valuations particularly given the rapid change in values and differences by geography.

Current industry systems lack necessary analytics. Current systems have limited risk models. Current predictive models are focused on assessing risk based on past performance and are not being used to analyze high risk performing loans. Current systems have limited NPV modeling and many lack the capability to calculate with accuracy the minimum amount of modification and cost required to keep the borrower out of default and/or foreclosure.

Current systems lack necessary reporting and monitoring for borrower profile updates and loan portfolio updates. Current systems have limited portfolio management and reporting capabilities and many lack a centralized data warehouse and "dashboard" management tool to sufficiently house, analyze, report, and track portfolio credit conditions. Current systems provide little automation in dashboard creation and existing dashboards are created using significant man power and thereby dashboard updates are available only on a less than real-time basis.

Current systems lack the capability to interact with people and implement processes to address limited borrower contact. Many loan servicers are unsuccessful in reaching borrowers to validate borrower data and process loan modifications. Loan servicers often have limited skills and staff to handle loan modification volume beyond a particular threshold number of loans. Loan servicers' threshold values may not accommodate a constant large volume of loan modifications, defaults and foreclosures. Loan servicers are often understaffed and under-skilled to handle an accelerating volume of defaults, modifications and foreclosures. Current systems provide no tools to focus on performing loans. Because of a lack of tools to perform the proper analysis, loan servicers have become conditioned to accept a general reluctance to review and take action on the "performing" component of the loan servicers' portfolios in order to monitor performing loans so that recommended proactive remediation measures may be taken as a result of analyzing borrower profile and loan portfolio updates.

The loan portfolio management (LPM) system includes a processor, and a memory coupled to the processor. The memory includes instructions that when executed by the processor may cause the processor to retrieve, into the memory, borrower data, macro economic data and loan servicer portfolio data for a loan servicer, wherein the loan servicer portfolio comprises data for loans to borrowers that the loan servicer services. The instructions may further cause the processor to analyze, using the loan servicer portfolio data and the macro economic data, the loans and the borrower data to prioritize the borrowers and the loans according to configurable risk threshold values and identify at risk loans. In one implementation, when one of the loans is determined to be an at risk loan, the instructions identify a contact management campaign for the borrower, recommend a remediation solution for the at risk loan according to the contact management campaign, monitor updates to the borrower data to determine whether the updated borrower data exceeds the configurable risk threshold values, and execute the remediation solution. The loan portfolio management system may further include a graphical user interface configured to display a loan servicer portfolio management interface. The loan servicer portfolio management interface may be configured to display the loan servicer portfolio, receive user input and display the remediation solution.

The LPM system instructions may further cause the processor to store the borrower data, macro economic data and loan servicer portfolio data in a data repository. The macro economic data may include pricing of mortgages, rate of unemployment, rate of underemployment, property values, and spreads between agency bonds and U.S. treasury bonds. Agency bonds may include bonds issued by U.S. government-sponsored agencies.

The LPM system instructions may further cause the processor to adjust the effects of comparing dissimilar borrower profiles as a result of regulatory and market changes by scaling borrowers using a borrower loan portfolio management index in order to filter the effects that cause statistical changes to the borrowers' profiles over time. Changes that occur over time may include, for example, regulatory changes, individual borrower profiles, borrower regulatory profiles, economic impact to the loan servicers and investors. When changes occur over time, the statistical similarities between borrowers in a loan portfolio change. The more variability in the profiles of borrowers, the more difficult the task of comparing borrowers in order to calculate better forecasts. Market changes include changes to contract terms and obligations between investors and loan servicers.

Alternatively or in addition, a loan remediation entity may use the LPM system to carry out, at least in part, the contact management campaign. The contact management campaign may be configured to maximize the ability of the loan remediation entity to contact the borrower and to encourage the borrower to agree to the remediation solution.

The LPM system instructions may further cause the processor to automatically route the borrower to the loan remediation entity external to the loan servicer when one of the loans is determined to be an at risk loan.

The LPM system instructions may further cause the processor to calculate a borrower loan portfolio management (LPM) index regulatory component, a LPM index market component, a LPM index loan servicer and investor component, and a borrower personal data component. The LPM system instructions may cause the processor to adjust the effects of comparing dissimilar borrower profiles as a result of regulatory and market changes by scaling borrowers using a borrower loan portfolio management index in order to filter the effects that cause statistical changes to the borrowers' profiles over time. Changes that occur over time may include, for example, regulatory changes, individual borrower profiles, borrower regulatory profiles, economic impact to the loan servicers and investors. When changes occur over time, the statistical similarities between borrowers in a loan portfolio change. The more variability in the profiles of borrowers the more difficult the task of comparing borrowers in order to calculate better forecasts. Market changes include changes to contract terms and obligations between investors and loan servicers.

The LPM system instructions may further cause the processor to analyze results of the executed remediation solution to identify whether the remediation solution was successful, identify a remediation resolution trend by comparing results of a previously executed remediation solution to the results of the executed remediation solution and refine the executed remediation solution into a new remediation solution to recommend to borrowers in the future.

The LPM system may generate recommended remediation solutions and alternative remediation solutions that conform to the contact management campaign. The recommended and the alternative remediation solutions each may comprise a success probability that identifies a probability of transforming the at risk loan into a performing loan. The LPM system instructions may use the success probabilities of the recommended and the alternative remediation solutions to display the recommended and the alternative remediation in a ranked order.

FIG. 1 illustrates an example of a loan portfolio manager (LPM) system configuration 100. The LPM system configuration 100 comprises an LPM system 102 in communication with various entities and data sources through a network 104. The various entities and data sources may include financial institutions 106, a loan remediation entity 108, borrower systems 110, regulator systems 112, user systems 114, loan servicers systems 116, 118, and 120, investor systems 122, a call center 124, loan modification processing center 126 and LPM data warehouse 128. The network 104 may include, the Internet, a Local Area Network (LAN), a Wireless Local Area Network (WLAN), a Personal Area Network (PAN), a Wide Area Network (WAN), or any other now known or later developed communications network.

The LPM system 102 communicates with the various entities and data sources through a communications interface 130, coupled to a processor 132 and memory 134. The memory 134 comprises data received from the various entities and data sources. For example, the data in the memory 134 may include borrowers' profiles 136, property data 138, financial institutions' data 140, loan portfolio performance data 142, contract data 143 and macro economics data 144 that the LPM system 102 stores in the LPM data warehouse 128. The memory 134 may further include loan servicer portfolio data 146 that comprises loan data (e.g., 148, 150, and 152) for each loan of the loan servicers' portfolios 146.

Portfolio analyzer logic 154 in the memory 134 may be configured to analyze the loan servicer portfolio data 146 in view of various data (e.g., 136, 138, 140, 142, 144, 146, 156, and 158) to assign an at risk loan identifier 160 to a loan identified to be at risk of default and/or foreclosure. The portfolio analyzer logic 154 may use configurable risk threshold values 162 to determine whether a loan in a servicer's portfolio 146 is at risk.

The LPM system 102 may include a graphical user interface 164 to receive data such as data updates 158 and user selections from users. A user interface (GUI) is a type of user interface which enables people to interact with electronic devices such as computers, hand-held devices (MP3 Players, Portable Media Players, Gaming devices), household appliances and office equipment. A GUI may offer graphical icons, and visual indicators as opposed to text-based interfaces, typed command labels or text navigation to fully represent the information and actions available to a user. The actions may be performed through direct manipulation of the graphical elements. More generally, a user interface may include software, hardware, or a combination thereof through which people—users—interact with a machine, device, computer program or any combination thereof.

Alternatively or in addition, the LPM system 102 may receive data such as data updates 158 and user selections from other systems, such as a borrower system 110, a user system 114, and at least one loan servicer system including, for example, loan servicer 1 116, loan servicer 2 118 and loan servicer 3 120. Each one of the borrower system 110, the user system 114, and loan servicer system may include respective GUIs.

Alternatively or in addition, the borrower system 110 may communicate borrowers' profile updates 156 to the LPM system 102. The borrower system 110 may receive the recommended remediation solutions 166 and the alternative remediation solutions 168 from the LPM system 102, when borrower health analyzer logic 170 stored in the memory 134 identifies a customer contact campaign match 172 for the borrower 110 from several customer contact campaigns 174. The LPM system 102 performs portfolio monitoring 176 of the various entities and data sources to refine the composition of tasks and execution of the recommended remediation solutions 166 and alternative remediation solutions 168. The LPM system 102 may analyze the campaign results 178 and remediation results 180 to refine the composition of tasks and execution of the recommended remediation solutions 166 and alternative remediation solutions 168. The LPM system 102 may determine success probabilities and loss estimates 182 for each loan 148, 150, and 152 in the loan servicers' portfolios 146, and success probabilities and loss estimates 182 forecasted to result when using each of the recommended remediation solutions 166 and the alternative remediation solutions 168.

The LPM system 102 may present various LPM results and/or direct other systems to present the various LPM results, such as performance data 142, campaign results 178, remediation results 180 and converted loans 188, and analysis in the form of portfolio reports 184 and dashboards 186. The various LPM results may be presented in the user interface 164, a borrower health analyzer interface 802, a portfolio analyzer interface 902 discussed below, and/or any other graphical user interface.

Figure 2:
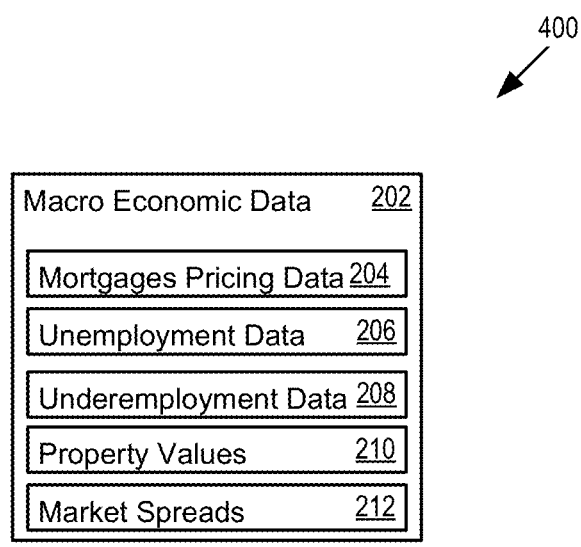
FIG. 2 illustrates example macro economic data.

FIG. 2 illustrates example macro economic data 202 the LPM system 102 may use to perform the loan portfolio and borrower health analysis. The macro economic data 202 may include mortgage pricing data 204, unemployment data 206, underemployment data 208, property values 210 and market spreads 212. For example, the macro economic data 202 may be used to identify pricing trends for various types of mortgages, changes to the rates of unemployment and underemployment, and changes in property values. The types of mortgages may include, for example, fixed rate mortgages, adjustable rate mortgages, and hybrid adjustable rate mortgages. The macro economic data 202 may identify changes in the spread between agency bonds and treasury bonds and forecast periods when fewer refinancing options exist.

Figure 3:
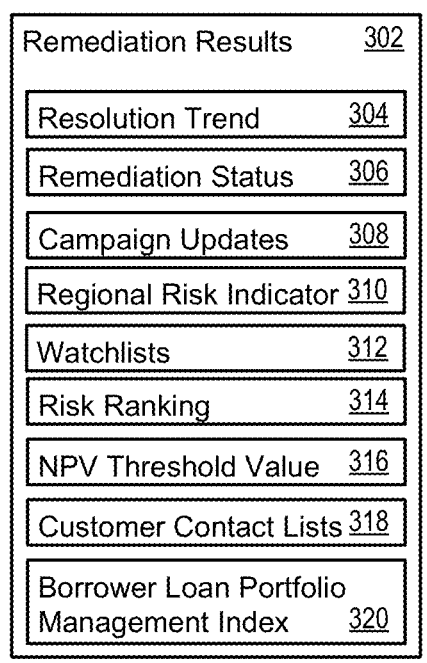
FIG. 3 illustrates example remediation results.

FIG. 3 illustrates example remediation results 302 that the LPM system 102 uses to refine the recommended remediation solutions 166, alternative remediation solutions 168, and customer contact campaigns 174. The remediation results 302 may include resolution trends 304, remediation status 306 for each loan remediated, campaign updates 308, regional risk indicators 310 that scale and/or normalize the remediation results adjusting for regional factors for each borrower and loan (e.g., 148, 150, and 152). The remediation results 302 may further include watchlists 312 used to identify borrowers identified for a customer contact campaign 174 and the corresponding loans 148, 150, and 152 of the identified borrower. The remediation results 302 may include risk rankings 314 for each loan. The risk rankings 314 identify the relative ranking of a probability of default and/or foreclosure on the loans. The remediation results 302 may include a NPV threshold value for each loan used to determine when to initiate recommended remediation solutions 166, alternative remediation solutions 168 and customer contact campaigns 174 for the borrower. The remediation results 302 may include customer contact lists 318 used to initiate and manage various aspects of the recommended remediation solutions 166, alternative remediation solutions 168 and customer contact campaigns 174.

The remediation results may also include a borrower loan portfolio management (LPM) index 320. The LPM system 102 may determine the borrower LPM index 320 in order to scale the loans and borrower profiles for each borrower. The borrower LPM index 320 may include a regulatory component, a market component, a loan servicer and investor component, and a borrower personal data component. The LPM system 102 may, based on the borrower LPM index 320, more accurately compare borrowers and loans by adjusting for differences that result over time from changes in regulatory and markets, changes to contract terms between loan servicers and investors, and changes to a borrowers personal data.

FIG. 4 illustrates example portfolio reports 402 that the LPM system 102 may produce to analyze the loan servicers' portfolios, and to execute the recommended remediation solutions 166, the alternative remediation solutions 168 and the customer contact campaigns 174. The portfolio reports 402 may include watchlists 404 used to identify borrowers 110 identified for a customer contact campaign 174 and the corresponding loans 148, 150, and 152 of the identified borrowers. The portfolio reports 402 may include risk rankings 406 for each loan that identifies the relative ranking of a probability of default and/or foreclosure on each loan, and NPV threshold values 408 for each loan used to determine when to initiate recommended remediation solutions 166, alternative remediation solutions 168 and customer contact campaigns 174 for a borrower. The portfolio reports 402 may include customer contact lists 410 used to initiate and manage various aspects of the recommended remediation solutions 166, the alternative remediation solutions 168 and the customer contact campaigns 174. The portfolio reports 402 may include loan portfolio performance statistics 412, forecasted scenarios 414, regional loan performance statistics 416 and campaign results 418.

FIG. 5 illustrates an example of portfolio monitoring results 502 that the LPM system 102 may produce when the LPM system 102 identifies the loan portfolio 146 to monitor. The LPM system 102 may identify one or more loans in the loan portfolio 146 to monitor by analyzing credit capacity index updates 504 for the borrowers and borrower LPM index updates 506. The LPM system 102 may determine which loan or loans in the loan portfolio 146 to monitor by analyzing NPV threshold values updates 508 for the loans 148, 150, and 152. For example, when the NPV of a property held by one of the loans 148, 150, and 152 satisfy configurable NPV threshold values 508, the LPM system 102 may add the borrower of that loan to the watchlists 404 and customer contact lists 510. The LPM system 102 may determine revised loan performance statistics 512 for each of loans 148, 150, and 152. The LPM system 102 may generate monitored results for forecasted scenarios 514 in order to compare forecasted scenarios with actual loan performance results. The LPM system 102 may generate regional performance statistics updates 516 and customer contact campaign refinements 518 for the recommended remediation solutions 166, alternative remediation solutions 168 and customer contact campaigns 174. The LPM system 102 may generate investor terms performance analysis 520 to analyze the contract terms of each loan in order to calculate an economic value of particular contract terms adjusted for changes that impact the economic value of the contract terms, including regulatory and market changes, changes to the contract terms between loan servicers and investors, and changes to a borrowers personal data over time.

Figure 6:
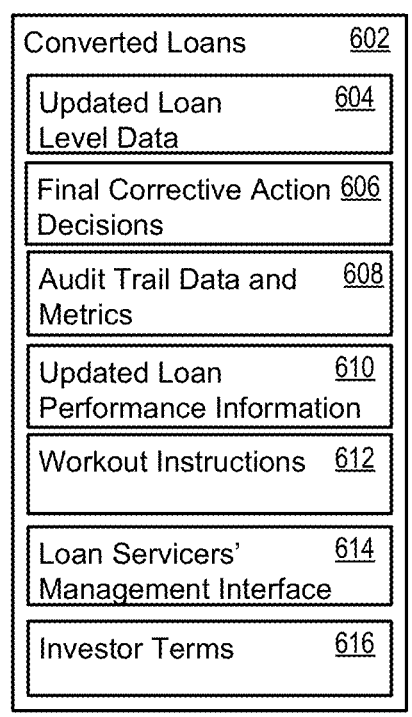
FIG. 6 illustrates example converted loans information.

FIG. 6 illustrates example converted loans 602 information analyzed, retrieved from various data sources, and stored in the LPM data warehouse 128. The converted loans 602 information may include updated loan level data 604, final corrective action decisions 606, audit trail data and metrics 608, updated loan performance information 610, workout instructions 612, loan servicers' management interface 614, and investor terms 616. The loan level data 604 may be used by the borrower health analyzer 170 to analyze risk at the loan level. The final corrective action decisions 606 detail the tasks to complete and/or already completed in order to successfully convert an at risk loan into a performing loan. The LPM system 102 may monitor audit trail data and metrics 608 received from various data sources 136, 138, 140, 142, 144, 146, 156, and 158 when a loan and/or borrower are identified for monitoring as an at risk loan. The updated loan performance information 610 is determined by the LPM system 102 from the various data sources 136, 138, 140, 142, 144, 146, 156, and 158. The LPM system 102 may generate workout instructions 612 used to guide a borrower to transforming an at risk loan into a performing loan. The loan servicers systems 116, 118 and 120 may use the loan servicers' management interface 614 to interact with the LPM system 102. The LPM system 102 may monitor the economic value of the changes to investor terms 616 for each converted loan 602.

Figure 7:
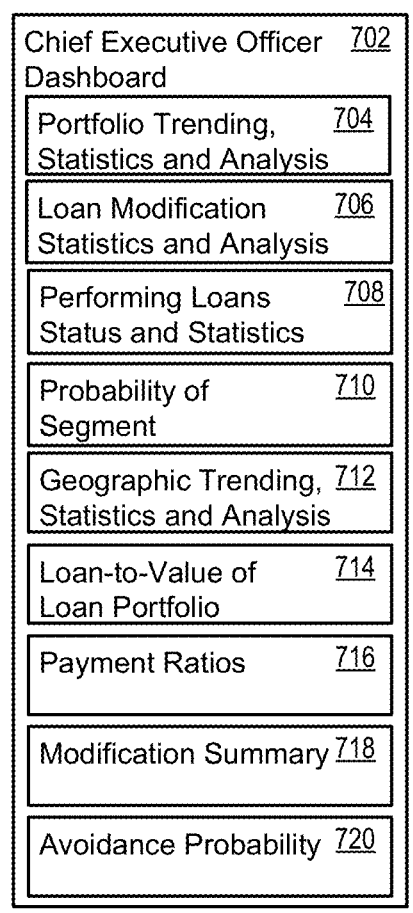
FIG. 7 illustrates example chief executive officer dashboard information.

FIG. 7 illustrates an example of chief executive officer information the LPM system 102 may generate in a chief executive officer dashboard 702. The chief executive officer dashboard 702 may include portfolio trending, statistics and analysis 704 information, loan modification statistics and analysis 706, performing loans status and statistics 708, probability of segment 710 information, geographic trending statistics and analysis 712, loan-to-value of loan portfolio 714, payment ratios 716 for loans in the loan portfolios, modification summary 718 for modified loans, and avoidance probability 720.

The portfolio trending, statistics and analysis 704 information may include any data related to the loan portfolio as a whole. For example, the portfolio trending, statistics and analysis 704 information may include NPV gain or loss for the current week, NPV gain or loss for the previous 6 months, and a projected three month NPV gain or loss. Additionally or alternatively, the portfolio trending, statistics and analysis 704 information may include a percentage of the loans for which corrective action has been taken during the last two months. Additionally or alternatively, the portfolio trending, statistics and analysis 704 information may include a total of the number of modified loans which do not re-default, and a summary of foreclosure costs avoided due to loan modifications.

The portfolio trending, statistics and analysis 704 information may reflect information related to segmented campaigns. The LPM system 102 may facilitate design and monitoring of the segmented campaigns to maximize contact with the borrower and to encourage default resolution actions by the borrower. The campaigns may be created to target various segments of borrowers. For example, the contact campaign segments may correspond to borrower demographics, such as borrowers having "performing loans" that are no more than 29 days late, "default loans" that are between 30 and 89 days late, and "foreclosure loans" that are at least 90 days late. In one example, the contact campaign segments may be identified by the customer via, for example, a self-directed portal. In a second example, the contact campaign segments may be identified by loan servicers. Customers may be contacted according to the campaign guidelines.

The loan modification statistics and analysis 706 may include information about loan modifications for each respective one of the contact campaign segments. For example, the loan modification statistics and analysis 706 may include summary information about loan modifications, such as the number of loans modified in the loan portfolio during a period of time, the total cost of the loan modifications, cost savings from avoided defaults, and a percentage of loans having terms, rates, and/or principals modified.

The performing loans status and statistics 708 may include information about the loans in each one of the contact campaign segments. For example the performing loans status and statistics 708 may include the number of loans in the respective one of the contact campaign segments, the NPV of those loans, the percentage of that those loans are of the total of number of loans in the portfolio.

The probability of segment 710 information may include, for example, an indication of whether the probability of defaulting on the loans in the respective one of the contact campaign segments is likely to increase, stay the same, or decrease. The geographic trending statistics and analysis 712 may include an indication of whether the geographic regions associated with the loans in the respective one of the contact campaign segments is likely to expand, stay the same, or shrink. The loan-to-value of loan portfolio 714 may include an indication of whether the loan-to-value of the loans in the respective one of the contact campaign segments is likely to improve, stay the same, or deteriorate. The payment ratios 716 for loans in the loan portfolios may include indication of whether the payment ratios for the loans in the respective one of the contact campaign segments is likely to improve, stay the same, or deteriorate.

Figure 8:
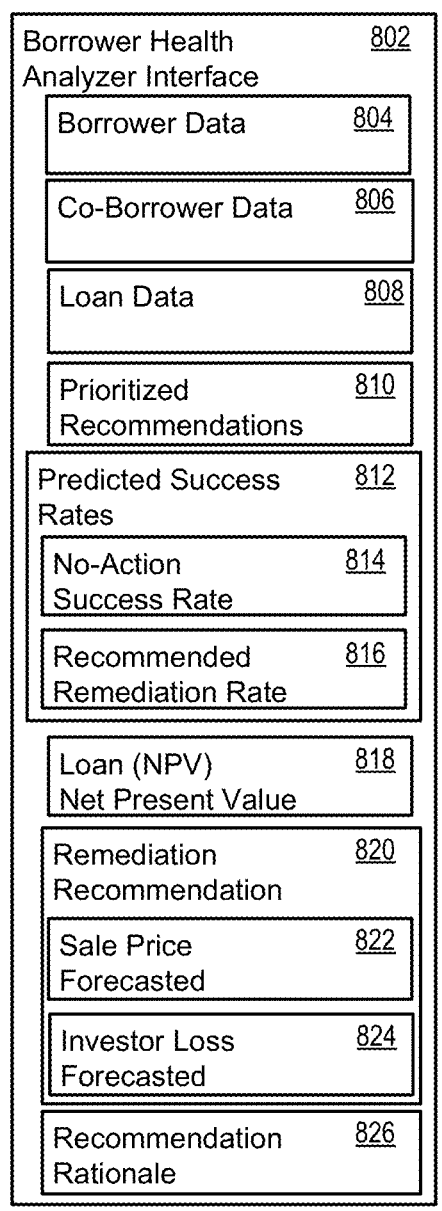
FIG. 8 illustrates example borrower health analyzer interface.

FIG. 8 illustrates an example borrower health analyzer interface 802. The LPM system 102 may use the borrower health analyzer interface 802 to present information and receive data (e.g., other data updates 158) and user selections from users, loan servicers and/or borrowers. The borrower health analyzer interface 802 may include borrower data 804, co-borrower data 806, loan data 808, prioritized recommendations 810 for each loan, predicted success rates 812 for each loan including a no-action predicted success rate 814 and a take recommended remediation action predicted success rate 816. The borrower health analyzer interface 802 includes loan NPV 818 information for each loan, remediation recommendations 820 and recommendation rationale 826 for each loan remediation recommendations 820 including a sale price forecasted 822 for the property held by the loan and investor loss forecasted 824.

Figure 9:
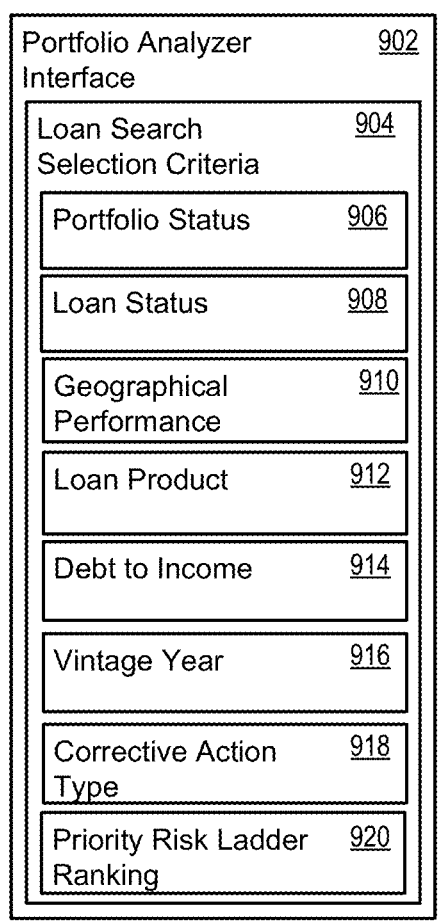
FIG. 9 illustrates example portfolio analyzer interface.

FIG. 9 illustrates an example portfolio analyzer interface 902. The LPM system 102 may use the portfolio analyzer interface 902 to present information and receive data, such as the other data updates 158, and user selections from users, loan servicers and borrowers. The portfolio analyzer interface 902 may include loan search selection criteria 904 comprising portfolio status 906, loan status 908, geographical performance 910, loan product 912, debt-to-income ratios 914, vintage year 916, corrective action type 918, and priority risk ladder ranking 920. The users, loan remediation entity, and loan servicers may use the portfolio analyzer interface 902 to develop forecasts and analyze the loan portfolio performance, such as the performance data 142, the campaign results 178 and the remediation results 180 based on the loan search selection criteria 904. The loan product 912 identifies the type of loan analyzed. The vintage year 916 identifies a subset classification of loans for a given year that the portfolio analyzer may use to further analyze the health of each loan and loan portfolio. The corrective action type 918 identifies the type of corrective action to be completed in order to comply with the recommended remediation and the completion status regarding the corrective action. The priority risk ladder 920 presents the loans in the order of risk to default and/or foreclosure.

Figure 10:
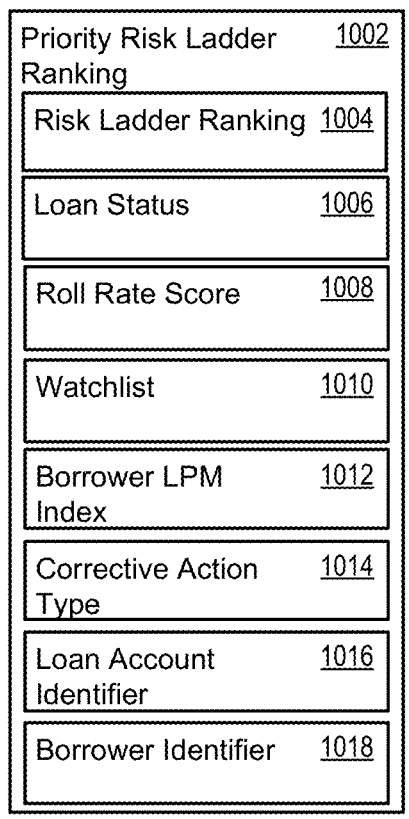
FIG. 10 illustrates priority risk ladder ranking.

FIG. 10 illustrates example priority risk ladder ranking 1002 components. The priority risk ladder ranking 1002 components may include, for each loan portfolio loan, a risk ladder ranking 1004 component that ranks at risk loans, a loan status 1006 component that identifies whether a loan is performing, in default or in foreclosure, and/or in transition to performing, default or foreclosure, a roll rate score 1008 component, a watchlist 1010 component that identifies the borrowers ranking on the watchlist 1010, a borrower LPM index 1012 component that scales borrowers by adjusting for changes in other factors, a corrective action type 1014, a loan account identifier 1016 component and borrower identifier 1018 component. The borrower LPM index 1012 component adjusts for the effects of comparing dissimilar borrower profiles as a result of regulatory and market changes by scaling borrowers using a borrower loan portfolio management index in order to filter the effects that cause statistical changes to the borrowers' profiles over time. Changes that occur over time include, for example, regulatory changes, individual borrower profiles, borrower regulatory profiles, economic impact to the loan servicers and investors. When changes occur over time, the statistical similarities between borrowers in a loan portfolio change. The more variability in the profiles of borrowers the more difficult the task of comparing borrowers in order to calculate better forecasts. Market changes include changes to contract terms and obligations between investors and loan servicers.

Figure 11:
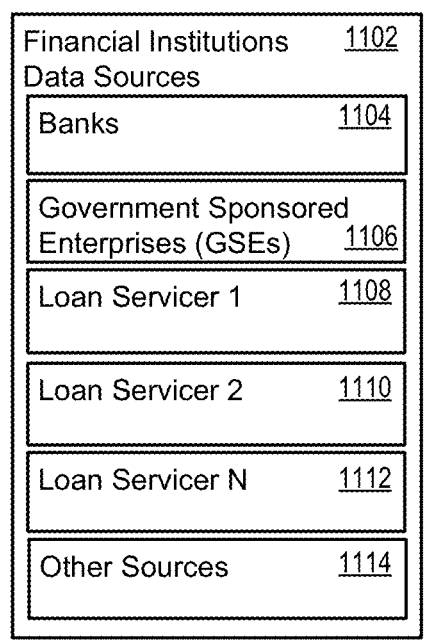
FIG. 11 illustrates financial institutions data sources.

FIG. 11 illustrates example financial institutions data sources 1102. The financial institutions data sources 1102 may include identifiers of banks 1104, government sponsored enterprises (GSEs) 1106 such as Fannie Mae, loan servicers 1108, 1110 and 1112 and other sources 1114.

Figure 12:
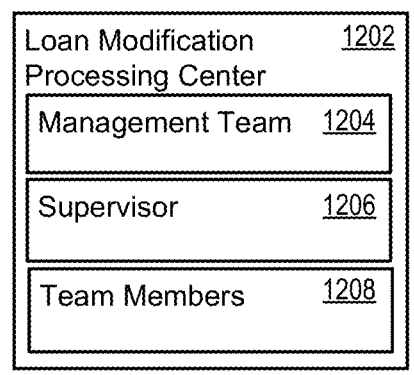
FIG. 12 illustrates example personnel and skills for loan modification processing center components.

FIG. 12 illustrates example personnel and skills components for loan modification processing center components 1202. The personnel and skills components for loan modification processing center components 1202 include a management team 1204, supervisors 1206 and team members 1208.

Figure 13:
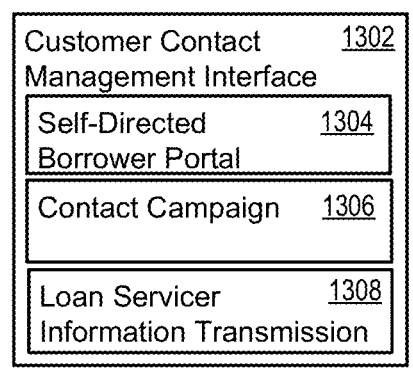
FIG. 13 illustrates customer contact management interface components.

FIG. 13 illustrates example customer contact management interface 1302 components. The customer contact management interface 1302 components include a self-directed borrower portal 1304 component, a contact campaign 1306 component and a loan servicer information transmission 1308.

FIG. 14 illustrates example portfolio analytics 1402. The portfolio analytics 1402 include for each borrower credit capacity index 1404, borrower LPM index updates 1406, priority rankings 1408, portfolio analytics descriptions 1410, refresh frequency 1412, current loan servicer capability 1414, remediation benefit analysis 1416, risk-capacity analysis 1418, borrower demographics 1420 and borrower performance uplift 1422.

Figure 15:
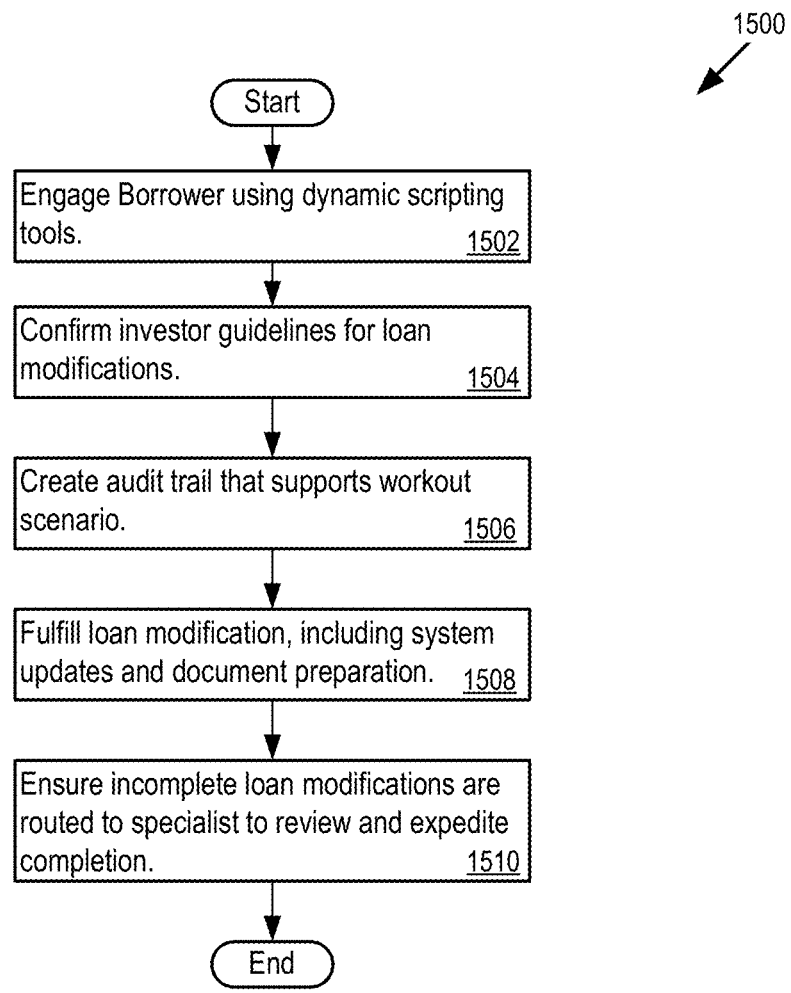
FIG. 15 illustrates example instructions logic to execute workout scenario/loan modification.

FIG. 15 illustrates example instructions logic 1500 stored in the memory 134 that is configured to execute workout scenario/loan modification. The instructions logic 1500 includes instructions configured to engage the borrower using dynamic scripting tools (1502). The instructions logic 1500 includes instructions configured to confirm investor guidelines for loan modifications (1504). The instructions logic 1500 includes instructions configured to create an audit trail that supports workout scenario (1506). The instructions logic 1500 includes instructions configured to fulfill loan modification, including system updates and document preparation (1508). The instructions logic 1500 includes instructions configured to ensure incomplete loan modifications are routed to specialist to review and expedite completion (1510). In different examples, of the instructions logic 1500 may include fewer, additional, or different instructions.

Figure 16:
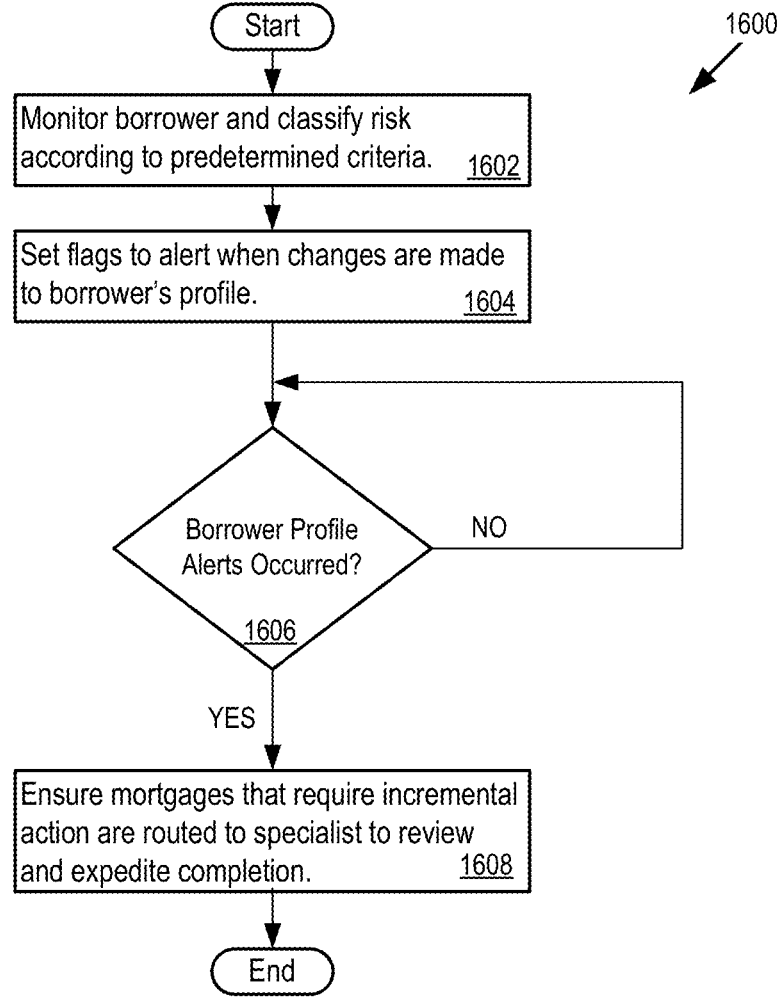
FIG. 16 illustrates example instructions logic to monitor a borrower watchlist.

FIG. 16 illustrates example instructions logic 1600 stored in the memory 134 and configured to monitor a borrower watchlist. The instructions logic 1600 may include instructions configured to monitor borrowers and classify risks according to predetermined criteria (1602). The instructions logic 1600 may include instructions configured to set flags to alert when changes are made to a borrower's profile (1604). The instructions logic 1600 may include instructions configured to monitor for borrower profile alerts (1606). The instructions logic 1600 may include instructions configured to ensure that mortgages requiring incremental action are routed to a specialist to review and expedite completion (1608) of such action. In different examples, of the instructions logic 1600 may include fewer, additional, or different instructions.

Figure 17:
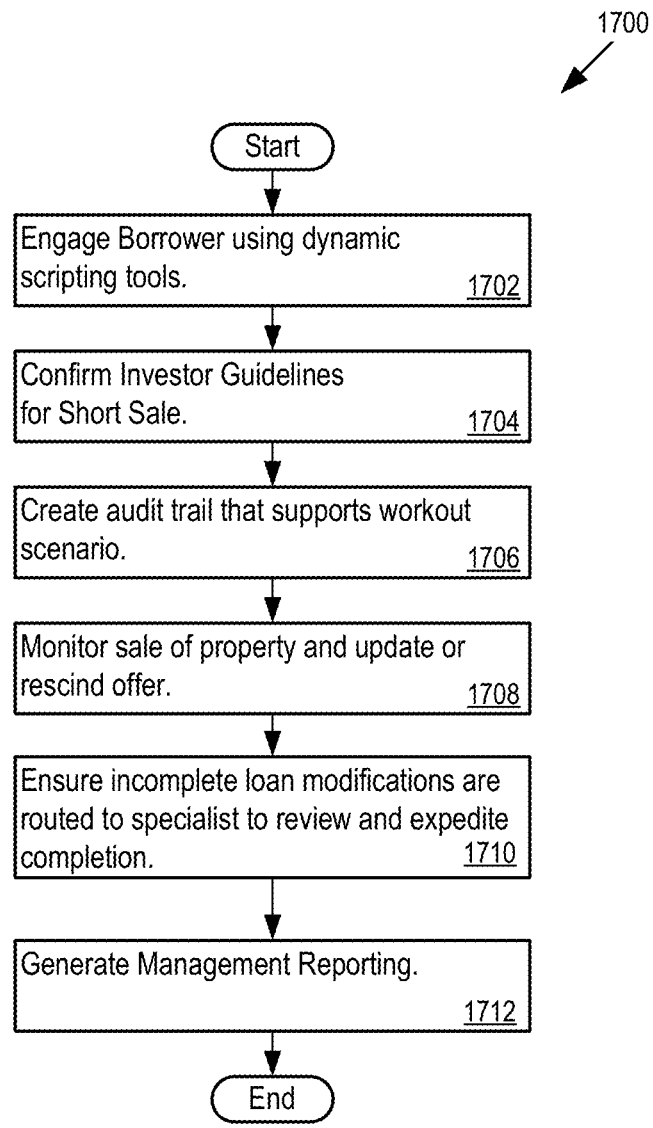
FIG. 17 illustrates example instructions logic to execute a short sale.

FIG. 17 illustrates example instructions logic 1700 stored in the memory 134 and configured to execute a short sale. The instructions logic 1700 may include instructions configured to engage borrower using dynamic scripting tools (1702). The instructions logic 1700 may include instructions configured to confirm investor guidelines for a short sale (1704). The instructions logic 1700 may include instructions configured to create audit trail that supports workout scenario (1706). The instructions logic 1700 may include instructions configured to monitor sale of property and update or rescind offer (1708). The instructions logic 1700 may include instructions configured to ensure incomplete loan modifications are routed to a specialist to review and expedite completion (1710). The instructions logic 1700 may include instructions configured to generate management reporting (1712). In different examples, of the instructions logic 1700 may include fewer, additional, or different instructions.

Figure 18:
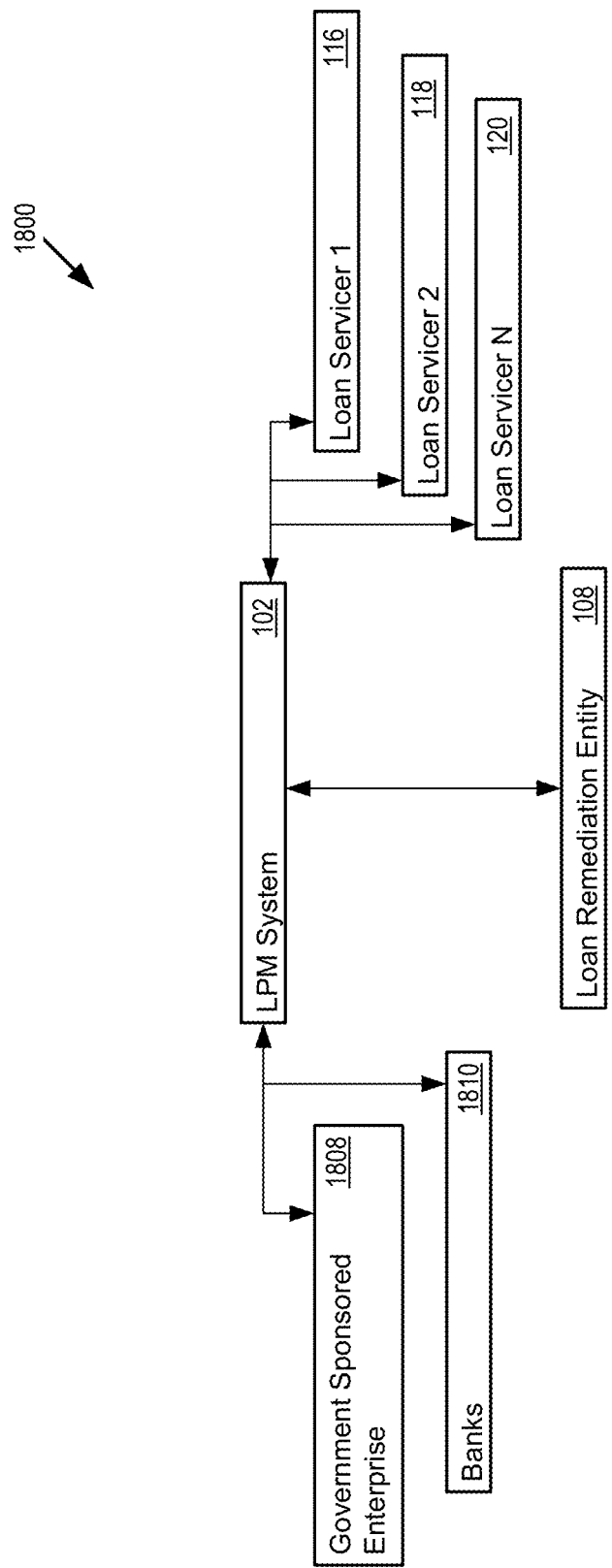
FIG. 18 illustrates example information and communications exchange between loan servicers, banks and government sponsored enterprise (GSEs).

FIG. 18 illustrates example information and communications exchange 1800 between the loan servicer systems 116, 118, and 120, banks 1808 and government sponsored enterprise (GSEs) 1810, as well as the LPM system 102 and the loan remediation entity 108. The communication may be conducted using any protocol now known or later discovered.

Figure 19:
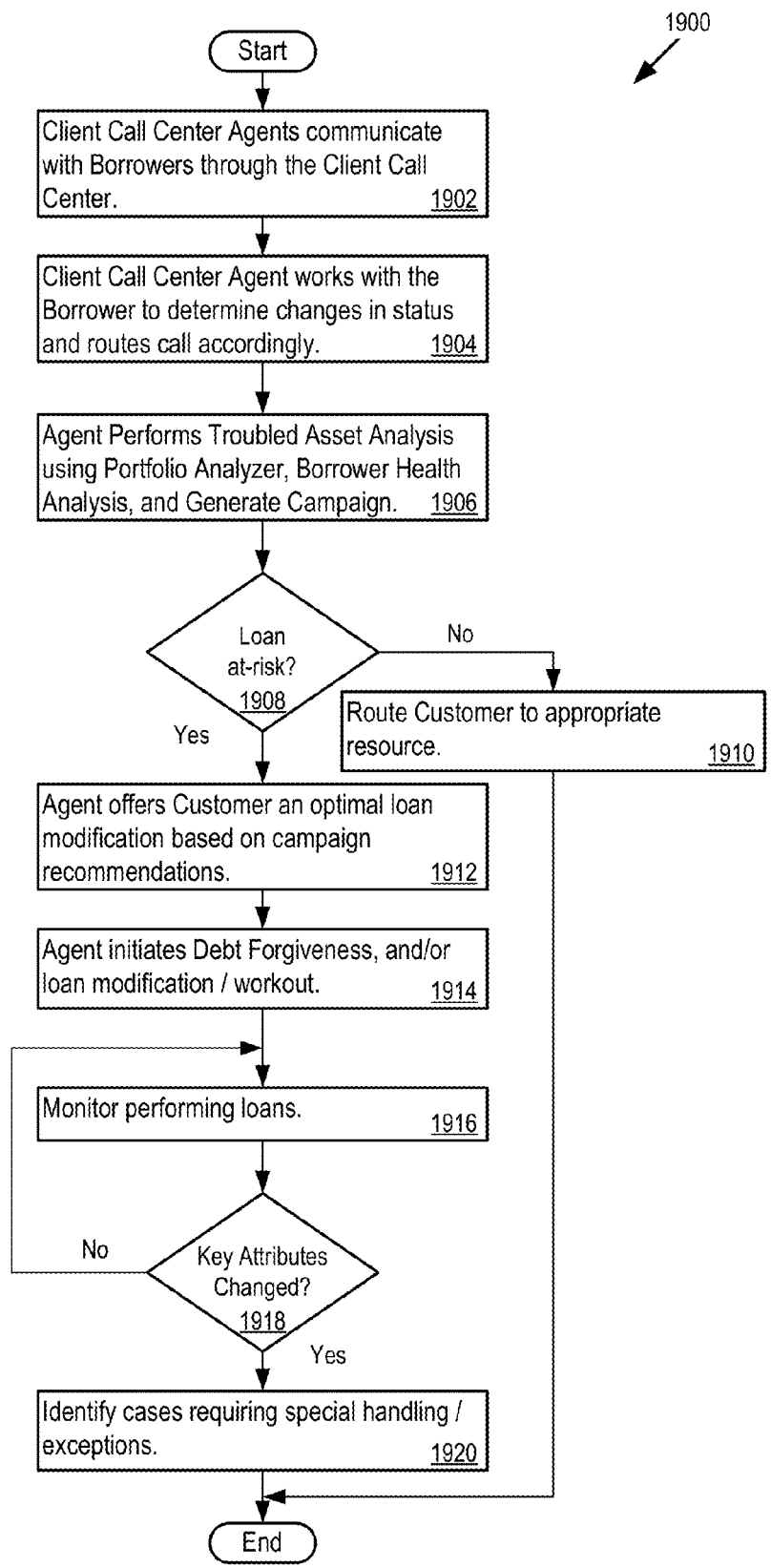
FIG. 19 illustrates example instructions logic to execute identify at risk loans and generate remediation recommendations.

FIG. 19 illustrates example operations 1900 to identify at risk loans and generate remediation recommendations. Call center agents may communicate with borrowers through the client call center (1902). The call center agent may work with the borrower to determine changes in status and route the call accordingly (1904). The call center agent may perform troubled asset analysis on the loans of the borrower. The call center agent may use the portfolio analyzer and the borrower health analyzer to identify and/or generate a campaign for the borrower (1906). The LPM system 102 may evaluate whether each loan is at risk (1908). The call center agent may route a customer to an appropriate resource (1910) when the loan is not at risk. When the loan is at risk, agent may offer the borrower an optimal loan modification based on campaign recommendations (1912) generated by the LPM system 102. The agent may initiate debt forgiveness, and/or loan modification/workout (1914). The LPM system 102 may monitor performing loans (1916). When key attributes change (1918), the LPM system 102 may identify cases requiring special handling/exceptions (1920). In different examples, the operation 1900 may include fewer, additional, or different operations.

Figure 20:
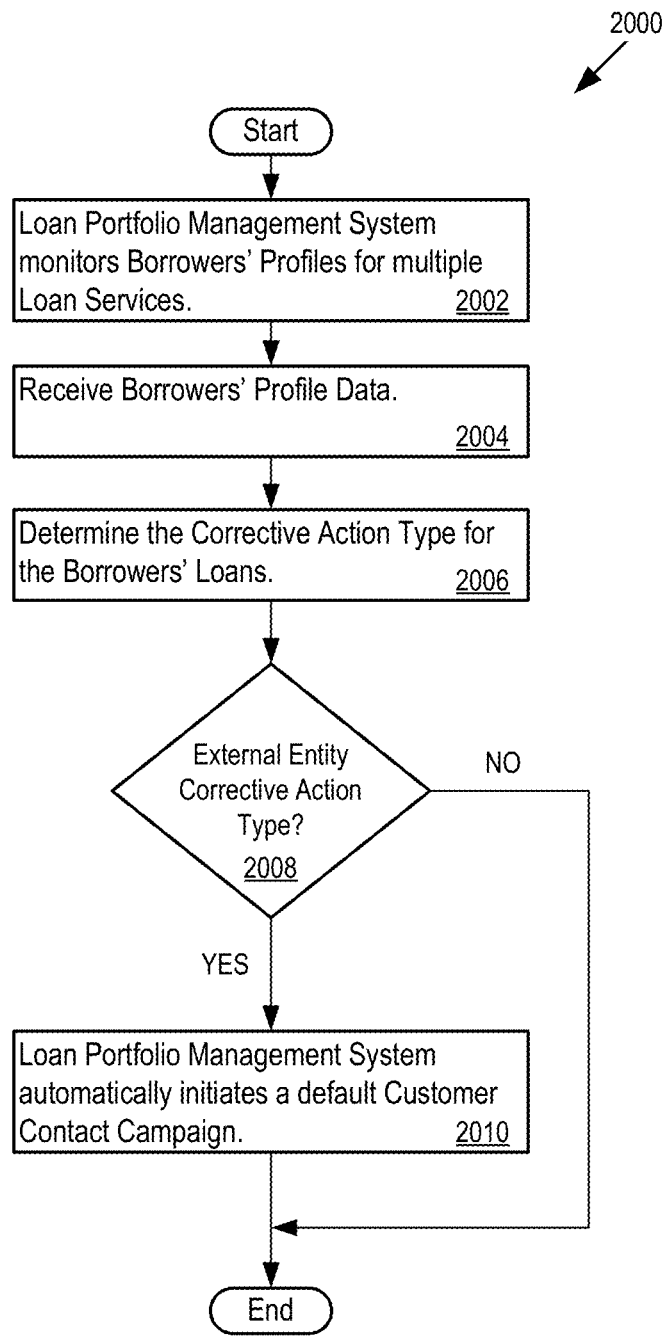
FIG. 20 illustrates example instructions logic to monitor borrowers' profile and determine whether to route a borrower to an external entity for corrective action.

FIG. 20 illustrates example instructions logic 2000 stored in the memory 134 to monitor borrowers' profile and to determine whether to route a borrower to an external entity for corrective action. The loan portfolio management system 102 may monitor borrowers' profiles for multiple loan servicers (2002). The LPM system 102 may receive borrowers' profile data (2004). The LPM system 102 may determine the corrective action type for the borrowers' loans (2006). The LPM system 102 may determine whether the corrective action type includes an external entity corrective action type (2008). If so, then the loan portfolio management system may automatically initiate a default customer contact campaign (2010). In different examples, the logic 2000 may include fewer, additional, or different operations.

Figure 21:
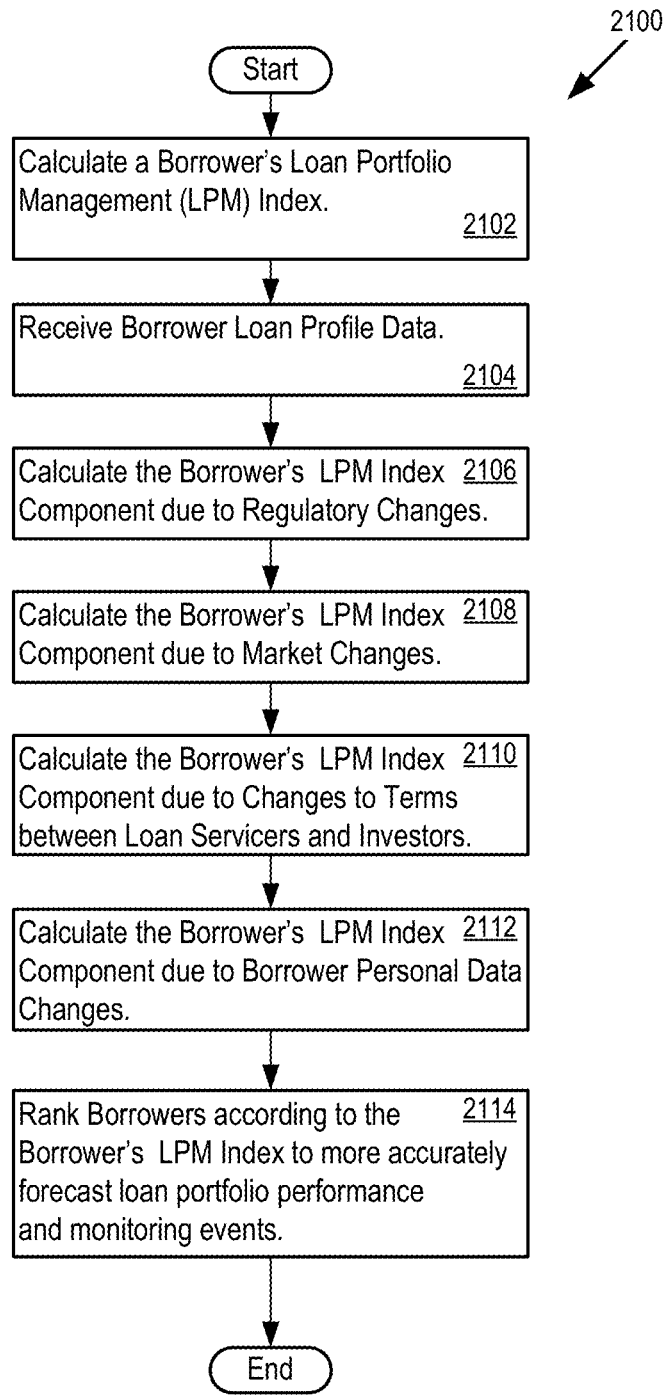
FIG. 21 illustrates example instructions logic to calculate a borrower's loan portfolio management (LPM) index.

FIG. 21 illustrates example instructions logic 2100 stored in the memory 134 and configured to calculate a borrower's loan portfolio management (LPM) index. The instructions logic 2100 may include calculating a borrower's loan portfolio management index (2102). The instructions logic 2100 may include receiving borrower loan profile data (2104). The instructions logic 2100 may include calculating the borrower's LPM index component due to regulator changes (2106). The instructions logic 2100 may include calculating the borrower's LPM index component due to market changes (2108). The instructions logic 2100 may include calculating the borrower's LPM index component due to changes to terms between loan servicers and investors (2110). The instructions logic 2100 may include calculating the borrower's LPM index component due to borrower personal data changes (2112). The instructions logic 2100 may include ranking borrowers according to the borrower's LPM index to more accurately forecast loan portfolio performance and monitoring events (2114).

Figure 22:
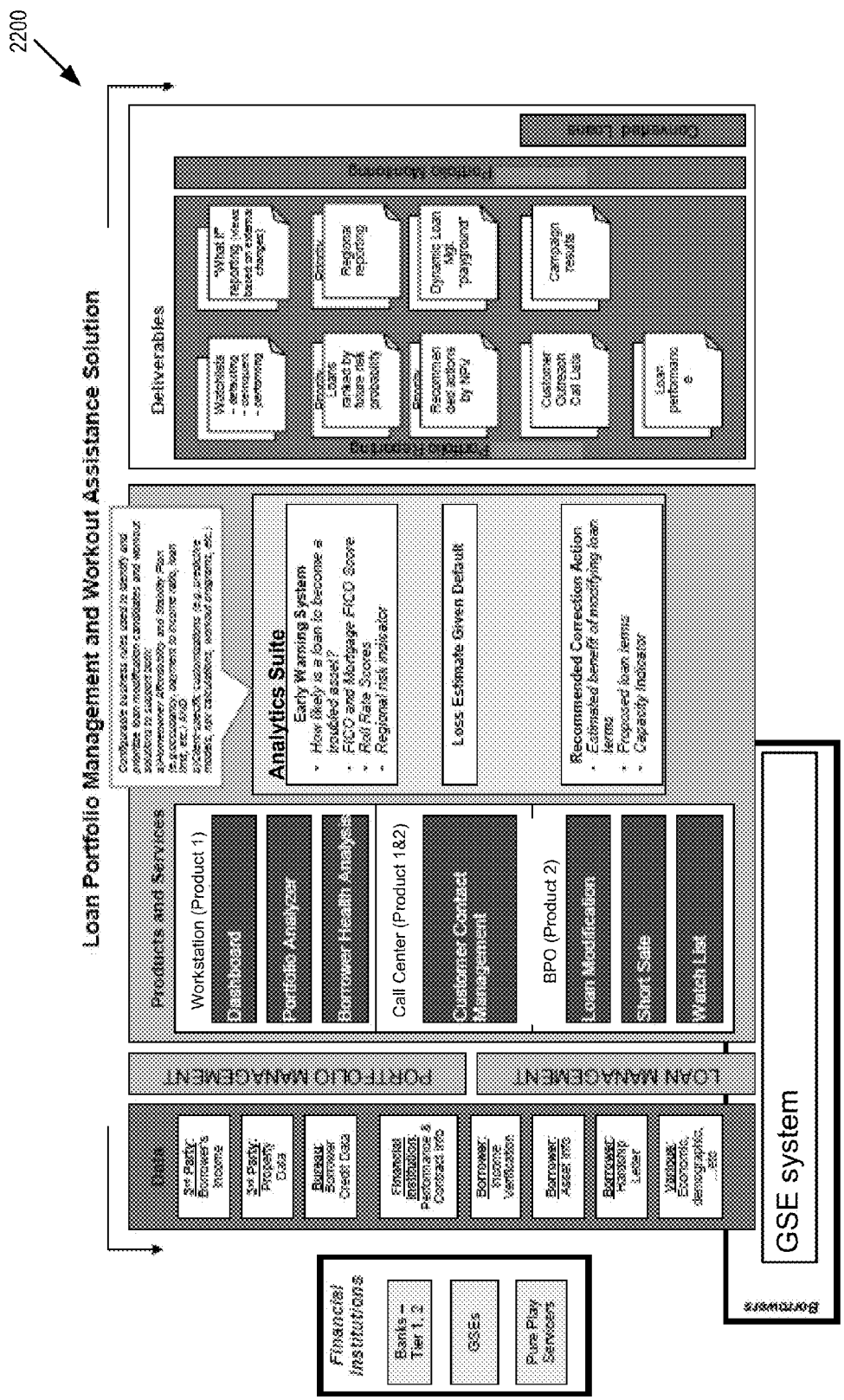
FIG. 22 illustrates an example organizational layout of the LPM system configuration.

FIG. 22 illustrates an example organizational layout 2200 of the LPM system configuration 100. The organization layout 2200 may include data, products based on the data, and services based on the products, where the data is regularly refreshed from financial institutions. Use of the products and services may reduce defaults, foreclosures, and accelerates workouts.

The products may include a workstation product, a business process outsourcing product, and an analytics suite. Financial institutions may include banks, GSEs, which are government sponsored enterprises, such as Fannie Mae, pure play servicers, such as companies dedicated to one line of business. The data may include borrowers' income, property data from which the loans are secured, borrower credit data, data indicative of performance of the loans, contract information associated with the loans, verification of income of the borrowers, assets of the borrowers, hardship letters from borrowers, economic data, demographic data, or any other data used for predictive modeling. The LPM system 102 may include a self-directed portal to collect updated borrower information directly from borrowers.

Updated income indicator may be used to calculate new payment to income ratio. New property valuation used to calculate new loan to value ratio.

The workstation product may include the dashboard, the portfolio analyzer, borrower health analyzer. The business process outsourcing product may include loan modification, short sale, and watch list capabilities.

The analytics suite may based on configurable business rules, identify and prioritize loan modification candidates and provide workout solutions to support customizing both: (1) Homeowner Affordability and Stability Plans, such as occupancy, payment to income ratio, loan limit, etc., and (2) client-specific customizations, such as predictive models, NPV calculations, workout programs, etc. The analytics suite may identify and rate potentially troubled assets. The analytics suite may provide an early warning system based on the likelihood of the loans in the loan portfolios may become a troubled asset, FICO scores, mortgage FICO scores; roll rate scores, and regional risk indicators. The analytics suite may determine a loss estimate if a loan were to default. The analytics suite may recommend correction action by identifying optimal loan modification terms for borrower and lender. The recommended correction action may be based on an estimated benefit of modifying loan terms, proposed loan terms; and credit capacity index updates 504 for the borrowers and borrower LPM index updates 506.

Deliverables of the LPM system 102 may include portfolio reporting to present results of the analytical calculations that may be used to drive corrective action at the regional and/or individual loan level; monitoring of loan portfolios; and converted loans that were modified based on the analytical recommendations. The portfolio reporting may include watchlists, loans ranked by future risk probability, recommend actions by NPV, customer outreach call lists, loan performance, "what if" reporting that based on external changes, regional reporting, dynamic loan management that provides a "playground" in which to carry out sample scenarios, and results of campaigns actually executed. The LPM system 102 facilitates aggregating, segmenting, and categorizing the loan portfolio data, so that a user may slice and dice the information to obtain a corresponding report.

Figure 23:
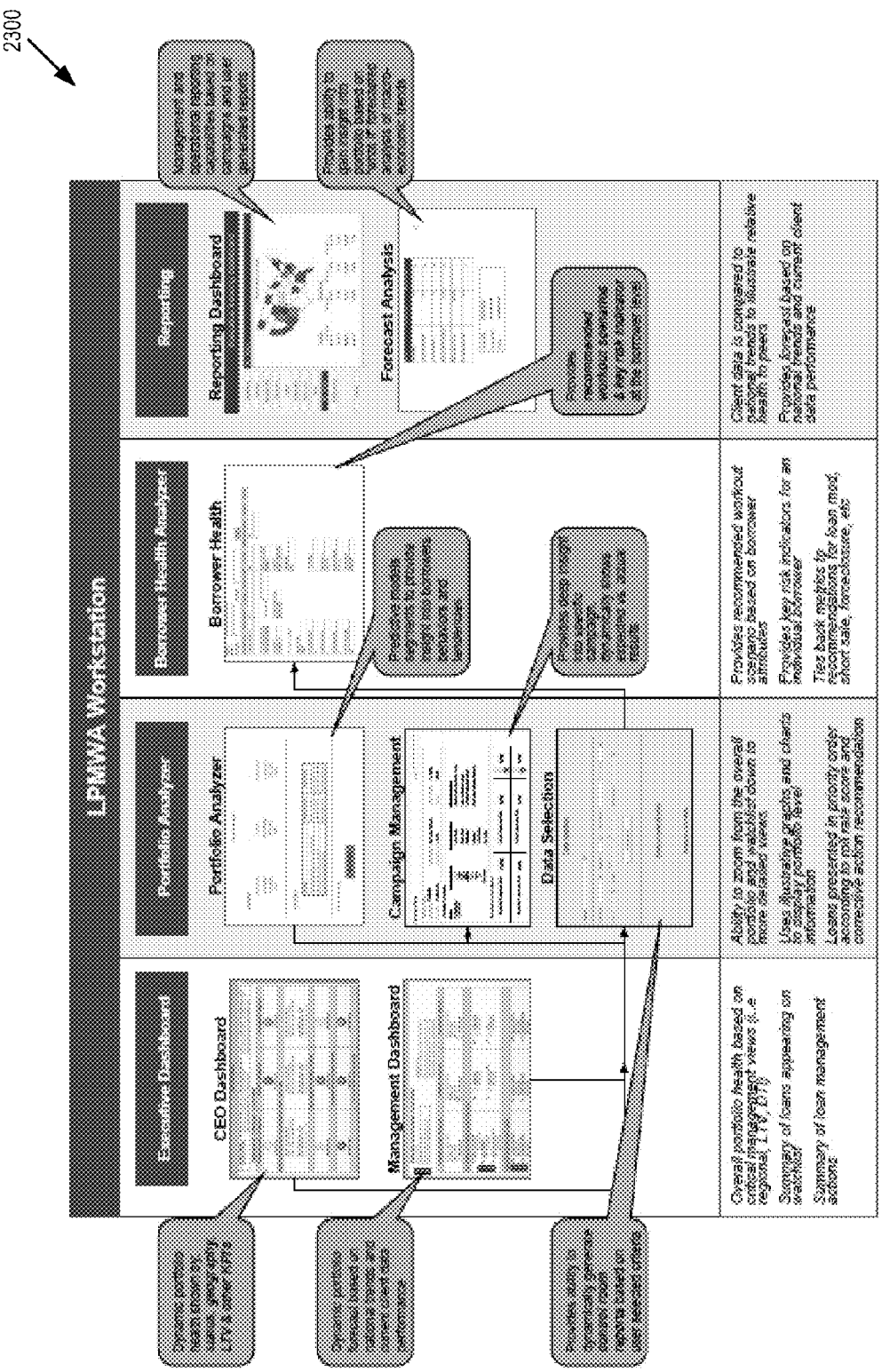
FIG. 23 illustrates an example LPM workstation interface.

FIG. 23 illustrates an example LPM workstation interface 2300. The LPM workstation interface 2300 may direct display of the executive dashboard, interact with the portfolio analyzer and the borrower health analyzer, and provide portfolio reporting. The executive dashboard may indicate the dynamic health of the loan portfolio. The dynamic health may be shown by status, geography, LTV or other key performance indicators (KPIs). The executive dashboard may provide a snapshot view of the overall portfolio with ability to drill down and view supporting details. The executive dashboard may provide a drill down capability in order to show specific loan performance. The executive dashboard may indicate a dynamic portfolio forecast and trends based on national trends and current client data performance. The overall portfolio health may be based on critical management views (i.e., regional, ITV—investment-to-value, DTI—debt-to-income). The executive dashboard may provide a summary of loans appearing on one or more watchlists and a summary of loan management actions. The summary of loans may include portfolio trending, including, for example: current week NPV gain/loss, previous six month NPV gain/loss, and projected three month NPV gain/loss.

LPM workstation interface 2300 may interact with the portfolio analyzer by providing the capability to zoom from the overall portfolio and watchlist down to more detailed views; use illustrative graphs and charts to display portfolio level information; loans presented in priority order according to roll rate score and corrective action recommendation. The interaction with the portfolio analyzer may display predictive models segments in order to provide insight into borrowers' behaviors and tendencies. LPM workstation interface 2300 may include the capability to provide deep insight into specific campaign and may dynamically display expected vs. actual results. LPM workstation interface 2300 may include the capability to dynamically generate control room reports based on user selected criteria.

LPM workstation interface 2300 may include interaction with the borrower health analyzer. The interaction with the borrower health analyzer provides recommended workout scenario based on borrower attributes; provides key risk indicators for an individual borrower; ties back metrics to recommendations for loan modifications, short sale, and foreclosure; prioritizes recommendations with rationale as well as the ability to override the decision; and prioritizes recommendations according to NPV. The interaction with the borrower health analyzer may be based on borrower data, co-borrower data, loan data, borrower health, loan documentation, the LPM system recommendation, short sale, and override entries. For example, the display of the LPM system recommendation may include prioritized recommendations ordered by any combination of the predicted success rate, NPV and rationale. For example, Short sale—PA recommendations including sale price, investor loss. PA recommendations rationale—borrower DTI in current loan is XX %, borrower anticipate job loss next 3 months-PA confirm job outlook weak in borrower region; borrower not able to successfully complete loan modification, and case-Schiller data indicates property value stabilization over next XXX months, investor approval date, and borrower willing to sell—confirmation and description of conditions for sale. Display of the borrower health may provide recommended workout scenarios and key risk indicator at the borrower level, and facilitate the execution of all loan management scenarios, including short sells.

The LPM workstation interface 2300 may include reporting capabilities. For example, client data may be compared to national trends to illustrate a loan's relative health to peers; forecasts may be based on national trends and current client data performance. In a second example, the LPM workstation interface 2300 may include management and operational reporting capabilities based on campaigns and user generated reports. In a third example, forecast analysis may provide the capability to gain insight into a portfolio based on "what if" forecasted analysis of macro-economic trends and current client data performance.

Figure 24:
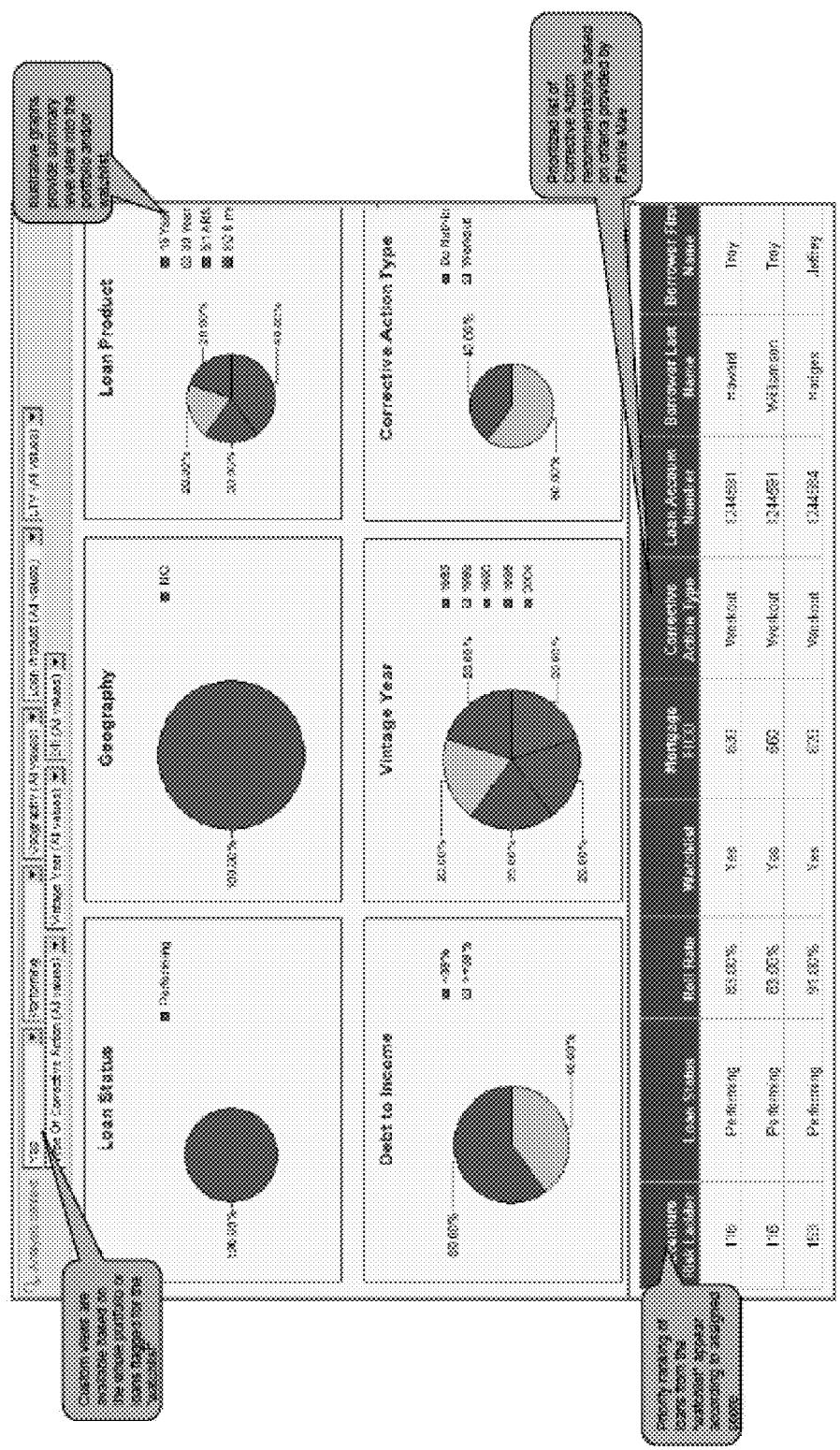
FIG. 24 illustrates an example portfolio analyzer interface.

FIG. 24 illustrates an example portfolio analyzer interface 2400. The portfolio analyzer interface 2400 may present a prioritized risk ranking of borrowers. The portfolio analyzer may provide a "risk laddering" capability which leverages analytics to strategically order borrowers from those most at risk to least. Custom views are available based on the whole portfolio or loans flagged for the "watchlist": Loan status, geography, loan product (durations in years and types), debt to income, vintage year, corrective action type (do nothing/workout) may be displayed. Prioritized list of corrective action recommendations may be based on criteria provided by Fannie Mae. Priority ranking of loans from the "watchlist" may appear according to assigned score. Displayed attributes may include, for example, the risk ladder rank, the loan status (e.g., performing), roll rate (%), watchlist (yes/no), mortgage FICO, corrective action type (workout), loan account number, borrower last name and first name.

Figure 25:
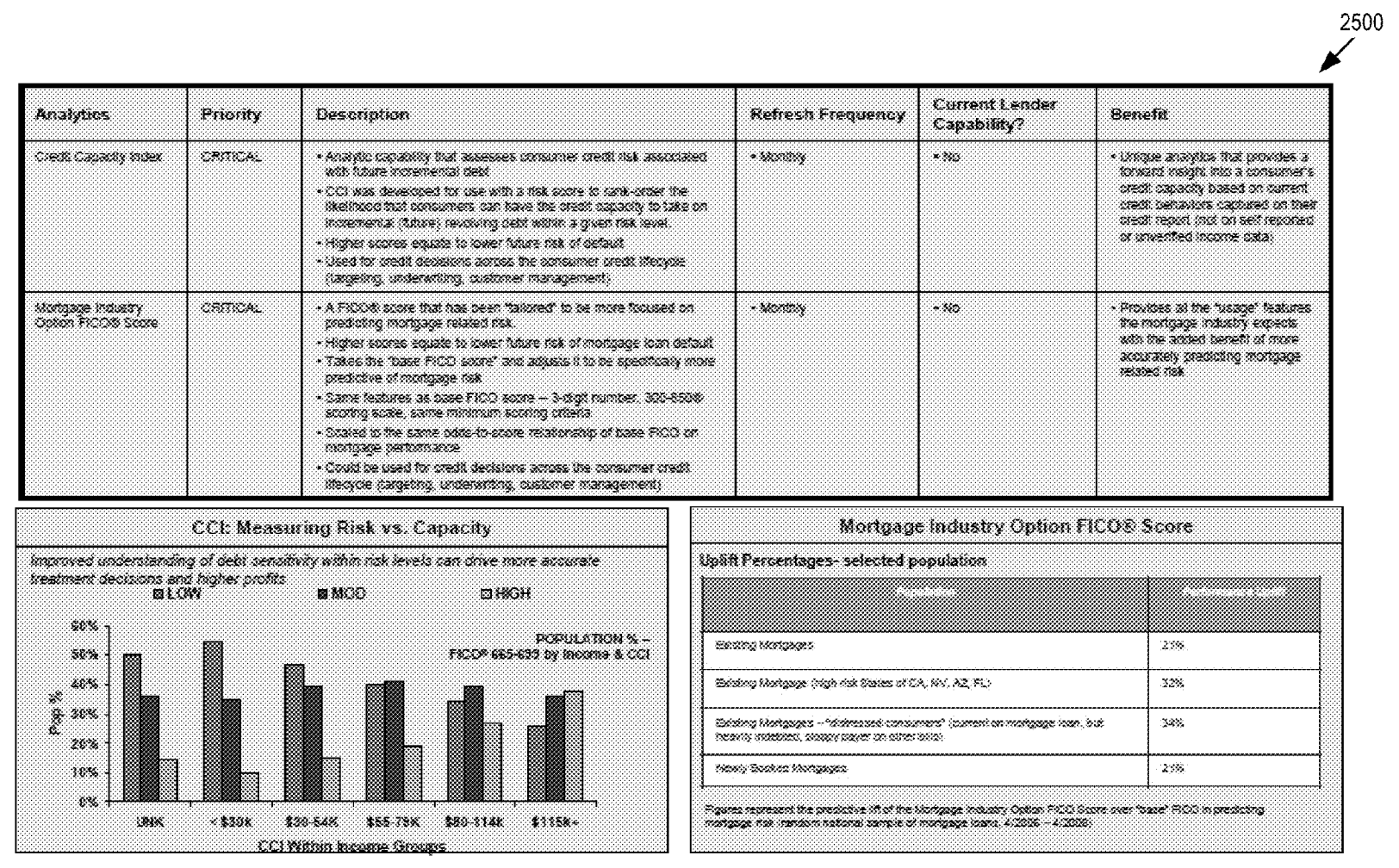

FIG. 25 illustrates example LPM analytics and metrics 2500. The LPM system 102 may leverage new analytics that servicers do not have available today in analyzing loan portfolio performance. For example, analytics not currently part of a servicer's portfolio risk analysis include a credit capacity index and the mortgage industry option FICO® Score.

The credit capacity index (CCI) is an assessment of consumer credit risk associated with future incremental debt. CCI is for uses with a risk score to rank-order the likelihood that consumers can have the credit capacity to take on incremental (future) revolving debt within a given risk level. Higher scores equate to lower future risk of default. Used for credit decisions across the consumer credit lifecycle, such as targeting, underwriting, customer management. The benefit of including the CCI in the analysis is to provide a forward insight into a borrower's credit capacity based on current credit behaviors captured on the borrower's credit report, which is not self-reported or unverified income data. The priority, refresh frequency, and whether a current lender has the capability to generate the analytic, credit capacity index, may be customized. Use of the CCI may lead to an improved understanding of debt sensitivity within risk levels, which may drive more accurate treatment decisions and higher profits.

The mortgage industry option FICO® score may be "tailored" to be more focused on predicting mortgage related risk. Higher scores may equate to lower future risk of mortgage loan default. The mortgage industry option FICO score may be the "base FICO score" adjusted to be more predictive of mortgage risk. The mortgage industry option mortgage FICO score may include the same features as base FICO score: 3-digit number, 300-850® scoring scale, same minimum scoring criteria, scaled to the same odds-to-score relationship of base FICO on mortgage performance, and usable for credit decisions across the consumer credit lifecycle. The mortgage industry option mortgage FICO score provides the "usage" features the mortgage industry expects with the added benefit of more accurately predicting mortgage related risk. The priority, refresh frequency, and whether a current lender has the capability to generate the analytic, mortgage industry option mortgage FICO score, may be customized.

The mortgage industry option FICO® score may uplift the based FICO score by a percentage based on selected borrower populations. For example, selected populations may include borrowers having existing mortgages, existing mortgages in high risk states, existing mortgages but where the borrowers are so called "distressed consumers," who may be current on a mortgage loan, but are heavily indebted, sloppy payment of other bills, and/or have newly booked mortgages. The predictive lift of the mortgage industry option FICO Score over the base FICO in predicting mortgage risk may be based on a random national sample of mortgage loans.

Figure 26:
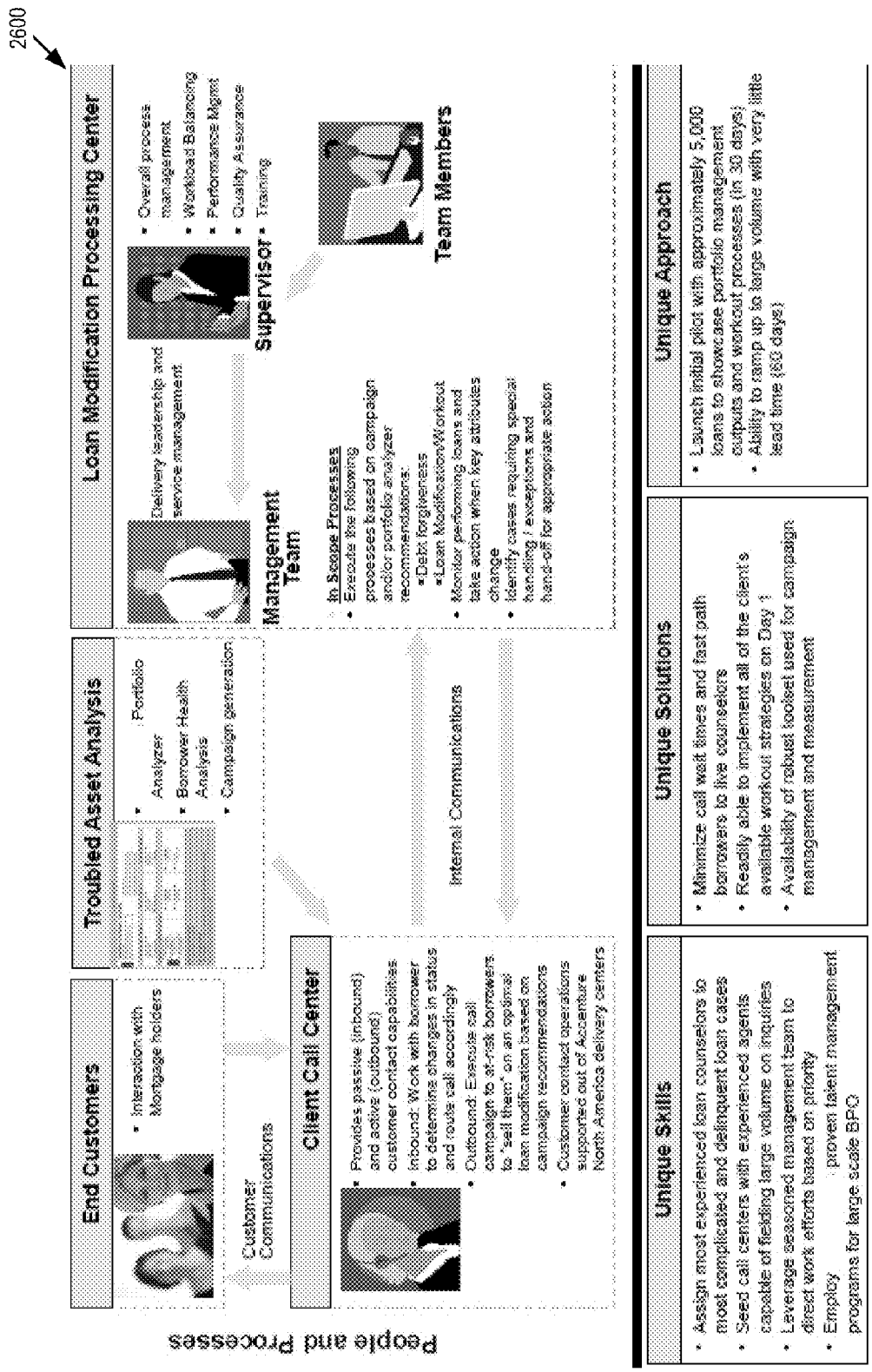
FIG. 26 illustrates an example high level workflow of the LPM processes.

FIG. 26 illustrates an example high level workflow of the LPM processes 2600. A loan servicer may outsource and/or co-source key default management functions that fall outside of the servicer's core business process. Workout scenario/loan modifications may include tasks such as engaging a borrower using dynamic scripting tools, confirming the loan is at risk and meets investor guidelines for loan modifications. The workout scenario/loan modifications tasks may further include creating an audit trail that justifies the workout scenario and can be defendable to investor. The LPM system 102 may retrieve, receive, and maintain status confirmation data to confirm when a loan has fulfilled the loan modification requirements (i.e. system updates and document preparation). The LPM system 102 also may ensure that incomplete loan modifications are tagged for expedited handling and routed for additional review and action to expedite resolution.

The LPM system 102 maintains a watchlist used to monitor borrowers and classify risks according to predetermined criteria. The LPM system 102 set flags to alert when changes are made to borrower's credit profile and reclassify borrower based on alerts and ensure mortgages that require incremental action are tagged for expedited handling and routed for additional review and action to expedite resolution.

The LPM system 102 may implement a short sale process according to the following: engage in borrower contact using dynamic scripting tools; confirm investor guidelines for short sale; create audit trail that justifies short sale scenario and can be defendable to investor; monitor sale of property and update or rescind offer as necessary; management reporting; and ensure incomplete short sales are tagged for expedited handling and routed for additional review and action to expedite resolution.

The LPM system 102 and loan remediation entity 108 may employ personnel with unique skills, and assign the most experienced loan counselors to the most complicated and delinquent loan cases. Borrowers' contacts with the call center are seeded with experienced agents capable of fielding a large volume of inquiries. The LPM system 102 leverages a seasoned management team to direct work efforts based on priority. The call center 124 may minimize call wait times and fast path borrowers to live counselors. The call center 124 and loan remediation entity 108 are readily able to implement the loan servicers selected workout strategies, and a robust toolset used for campaign management and measurement.

Portfolio management outputs and workout processes may be implemented in very little time and the LPM system 102 may be ramped up to handle large volume with very little lead time. In one example, end customers, i.e., borrowers, may interact with mortgage holders through a client call center. The client call center may provide passive (inbound) and active (outbound) customer contact capabilities. In one example, the call center may handle inbound contacts by working with borrowers to determine changes in status and route call/contact accordingly. In a second example, the call center may handle outbound contacts by executing a call campaign to at-risk borrowers to "sell" the borrowers on an optimal loan modification based on campaign recommendations.

The LPM system 102 may provide troubled asset analysis to client call center agents. For example, the client call center agents may use the portfolio analyzer, borrower health analyzer, and campaign generation.

In one example, the LPM system 102 may handle internal communication between the client call center and a loan modification processing center. The loan modification processing center may include managers, supervisors, and other team members experience with process management, workload balancing, performance management, quality assurance, training, delivery leadership, and service management. The loan modification processing center may execute the following processes based on campaign and/or portfolio analyzer recommendations: debt forgiveness; loan modification/workout; monitor performing loans and take action when key attributes change; identify cases in need of special handling/exceptions and hand-off for appropriate action.

Figure 27:
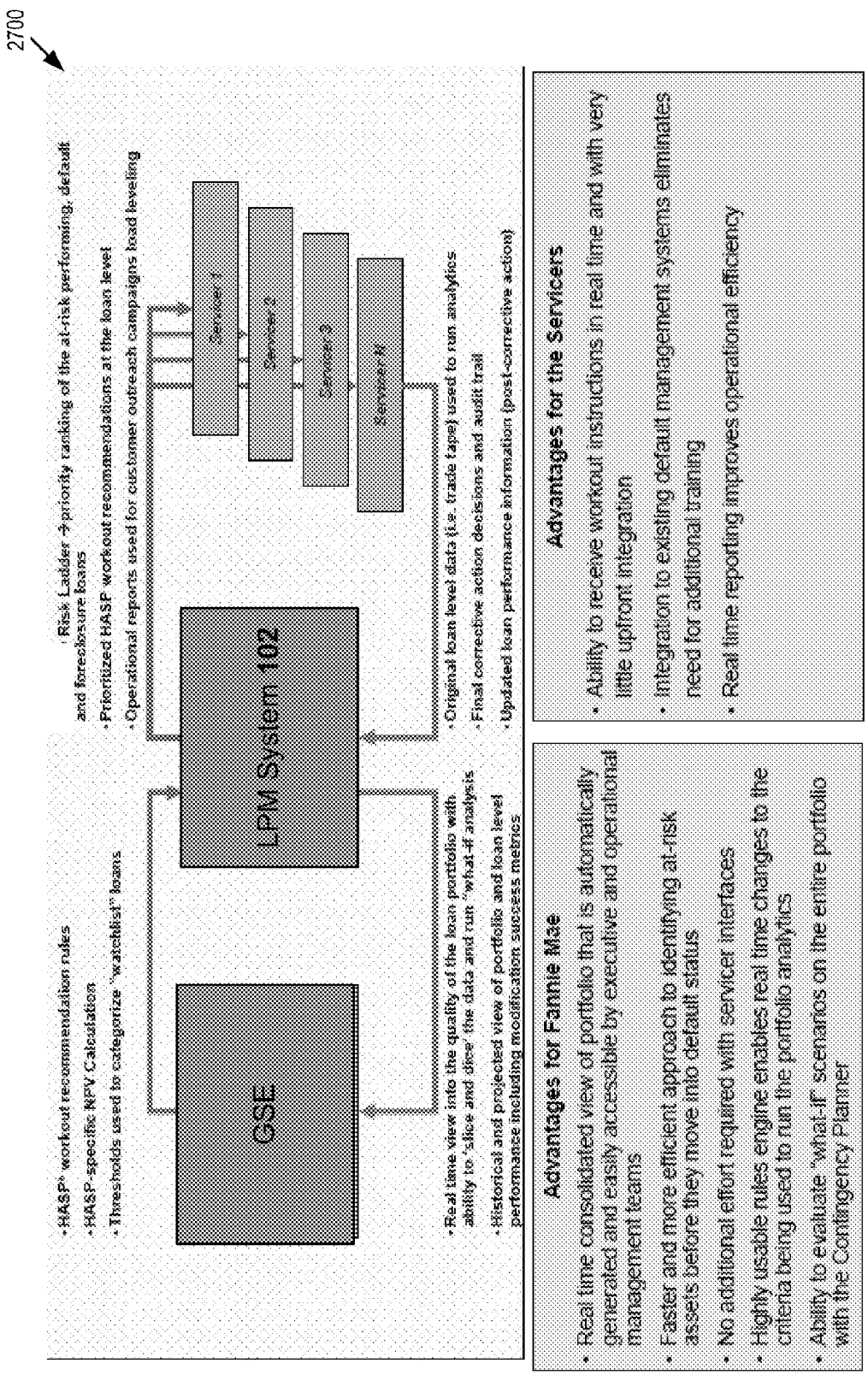
FIG. 27 illustrates another example of information and communications exchanged between loan servicers, banks and government sponsored enterprises (GSEs).

FIG. 27 illustrates another example of information and communications exchanged 2700 between loan servicers, banks and government sponsored enterprise (GSEs). The Homeowner Affordability and Stability Plan (HASP) was created by the Federal Government to offer assistance to homeowners (borrowers) making a good faith effort to stay current on home mortgage payments, preserve the home and protect the borrower's credit. A GSE in charge of executing a program such as HASP may use the LPM system 102 to execute that program. The LPM system 102 promotes transparency, traceability and flexibility throughout the distressed asset identification and workout recommendation processes. The advantages for the GSE may include: a real time consolidated view of a portfolio that is automatically generated and easily accessible by executive and operational management teams; faster and more efficient approach to identifying at-risk assets before they move into default status; and no additional effort required with loan servicer interfaces. The advantages for the servicers may include: the ability to receive workout instructions in real-time with very little upfront integration; integration with existing default management systems eliminates need for additional training; and real-time reporting improves operational efficiency. The LPM system 102 employs a highly usable rules engine that enables real time changes to the criteria being used to run the portfolio analyzer. The LPM system 102 provides the ability to evaluate "what-if" scenarios on the entire portfolio as a contingency planner capability.

During operation, the LPM system 102 may receive, from the GSE, HASP workout recommendation rules, HASP-specific NPV calculation, thresholds used to categorize "watchlist" loans. The LPM system 102 may provide a real-time view into the quality of the loan portfolio with the ability to analyze the data at various levels of detail, and perform 'what-if' analysis. The real-time view may include historical and projected views of portfolio and loan level performance such as modification success metrics.

The LPM system 102 may use a risk ladder, HASP workout recommendations at the loan level, operational reports used for customer outreach campaigns, and load leveling to route loans to particular servicers. The risk ladder may include a priority ranking of at-risk performing, default and foreclosure loans. Servicer systems may provide the LPM system 102 with original loan level data, trade tape, used to run analytics, final corrective action decisions and audit trail, and updated loan performance information (post-corrective action).

Figure 28:
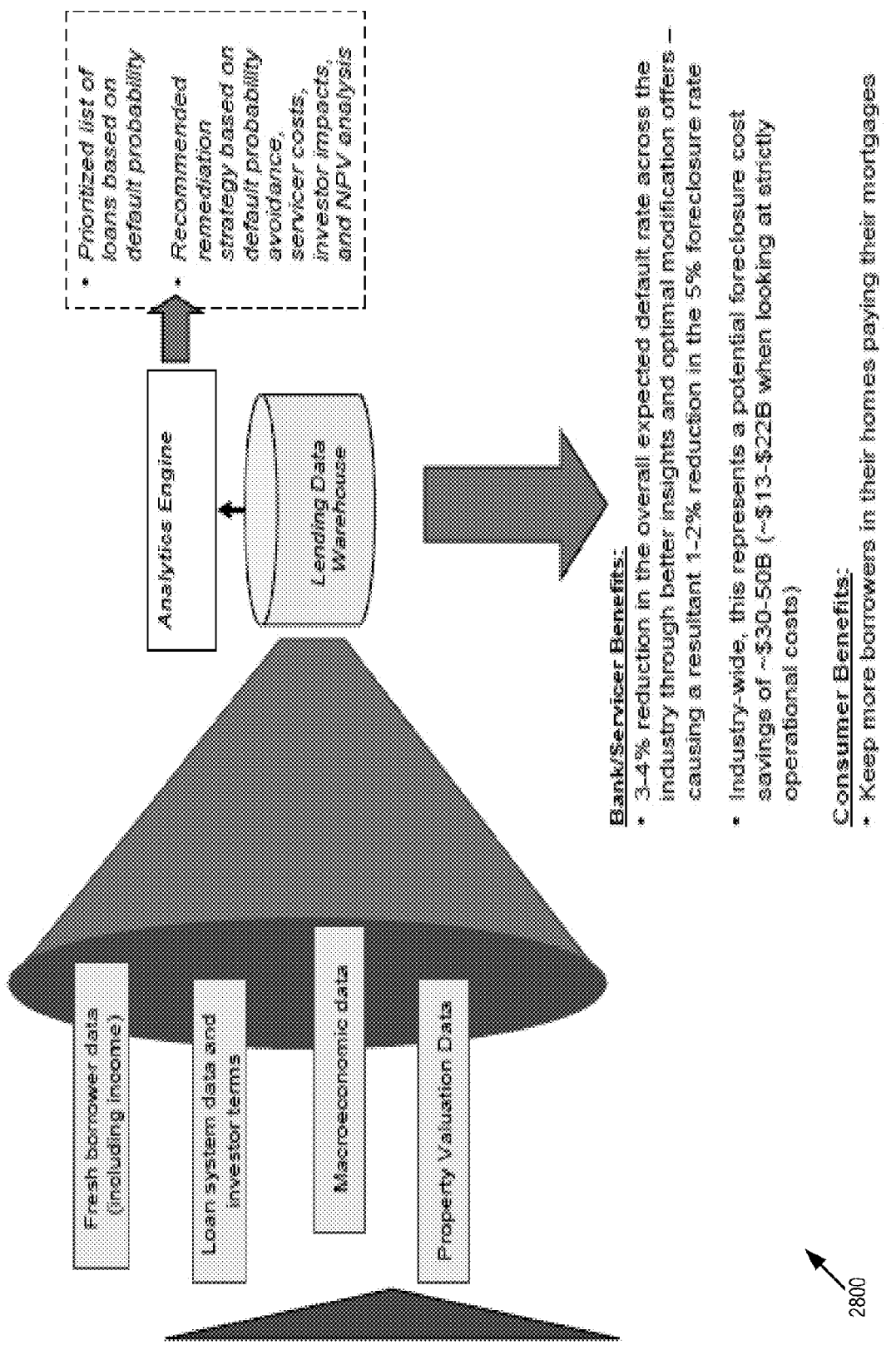
FIG. 28 illustrates an example data flow.

FIG. 28 illustrates an example LPM system data flow 2800.

Figure 29:
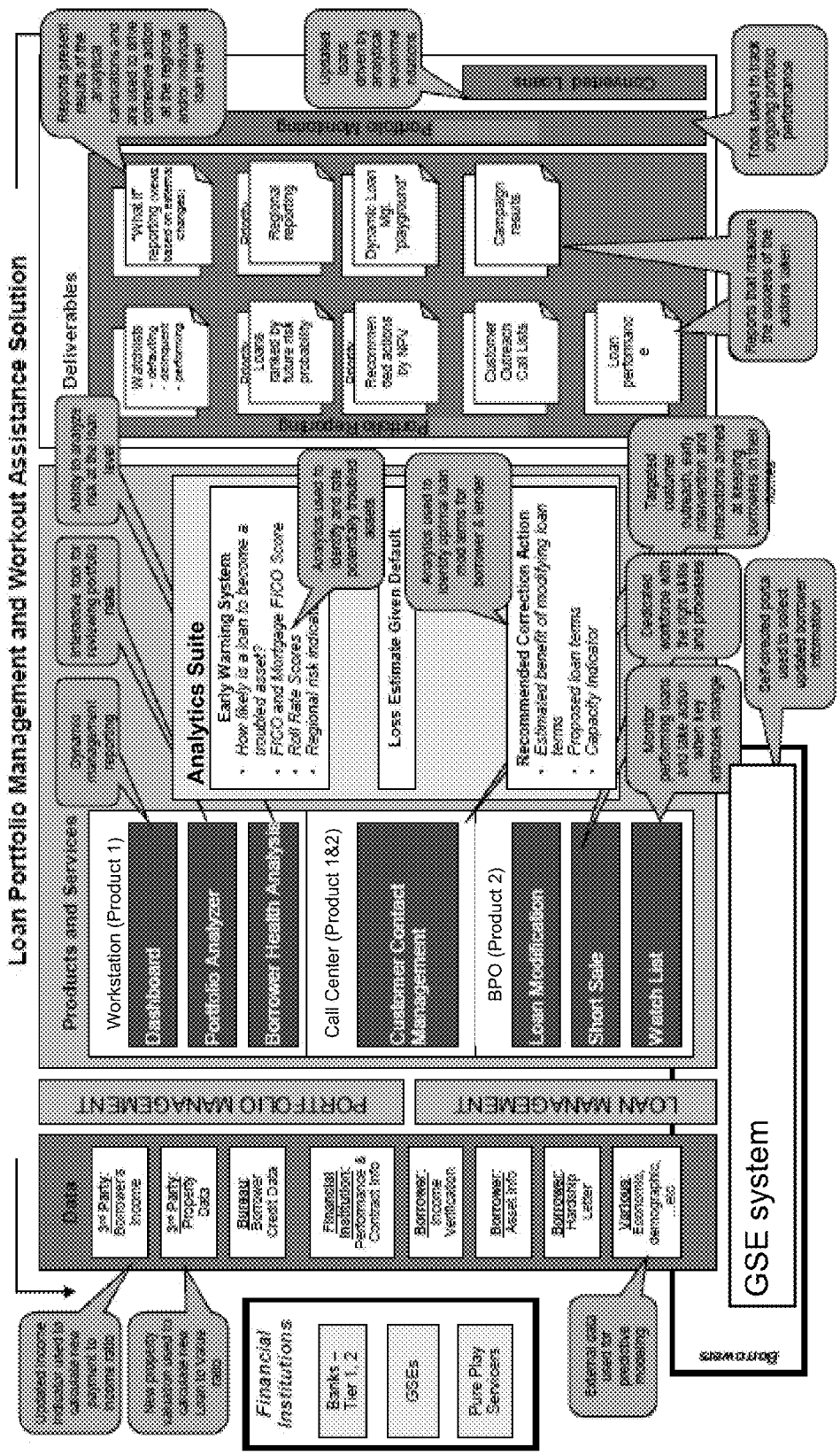
FIG. 29 illustrates another example organizational layout of the LPM system configuration.

FIG. 29 illustrates another example organizational layout 2900 of the LPM system configuration 100.

Figure 30:
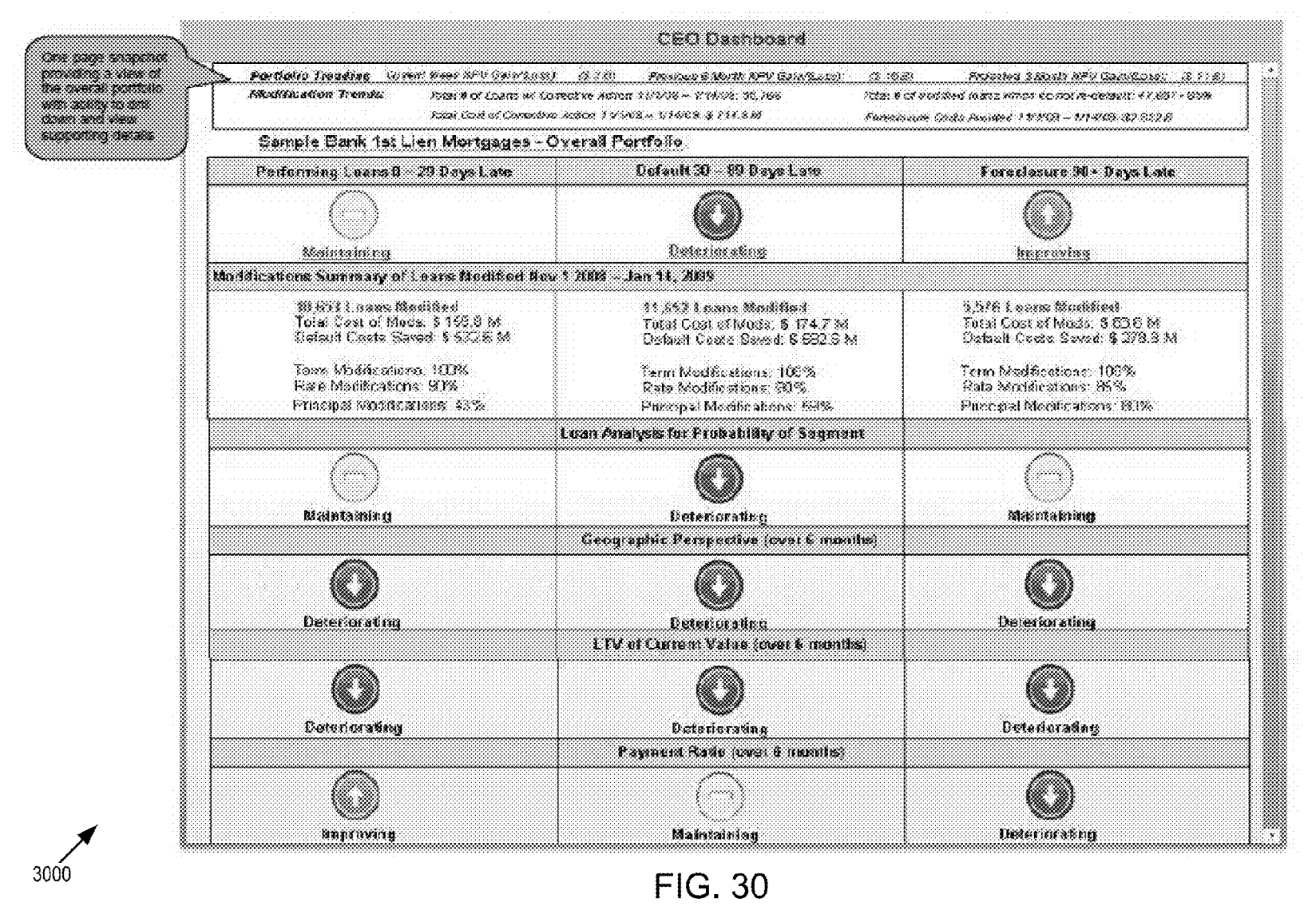

FIG. 30 illustrates an example a chief executive officer dashboard 3000.

Figure 31:
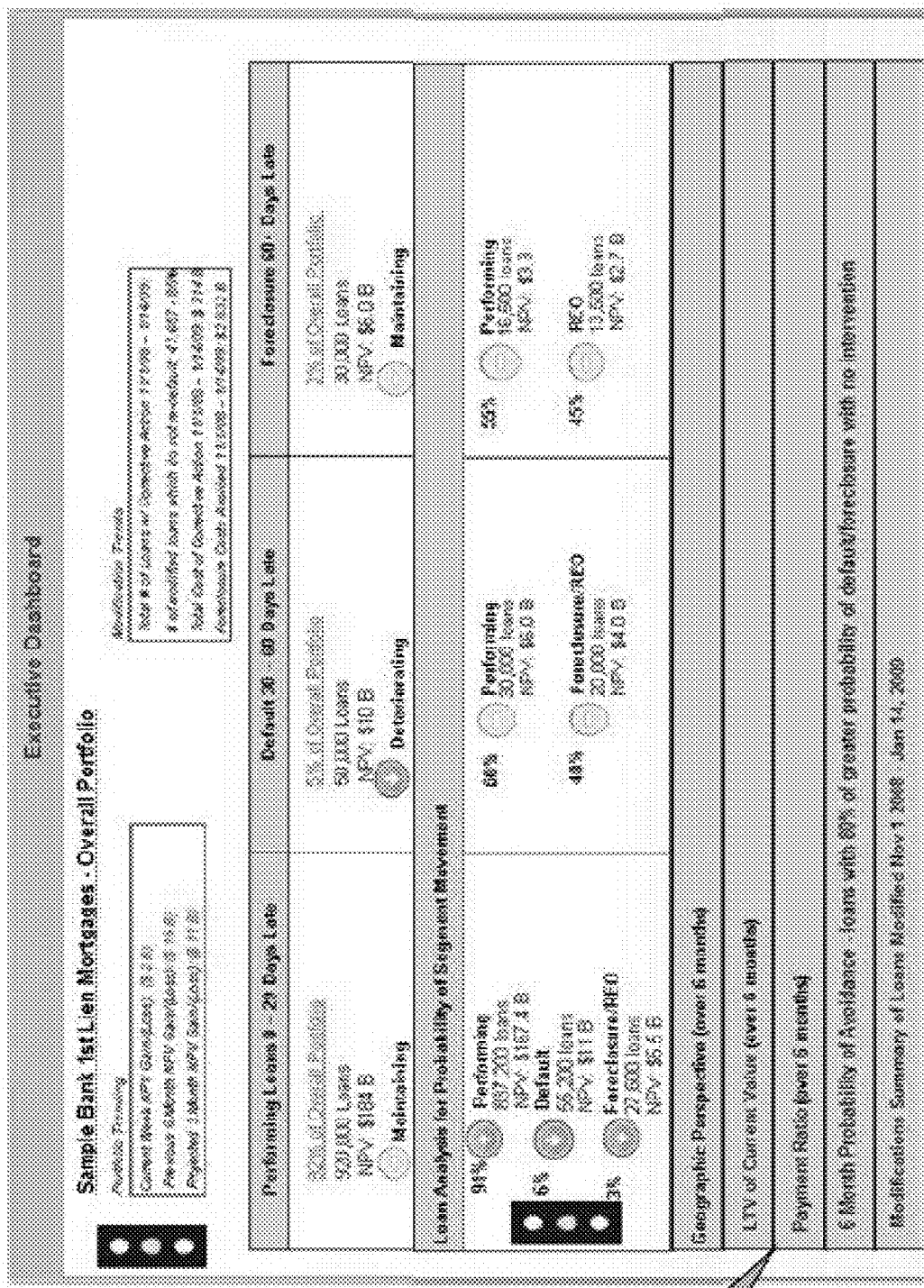
FIG. 31 illustrates another example chief executive officer dashboard.

FIG. 31 illustrates another example chief executive officer dashboard 3100.

Figure 32:
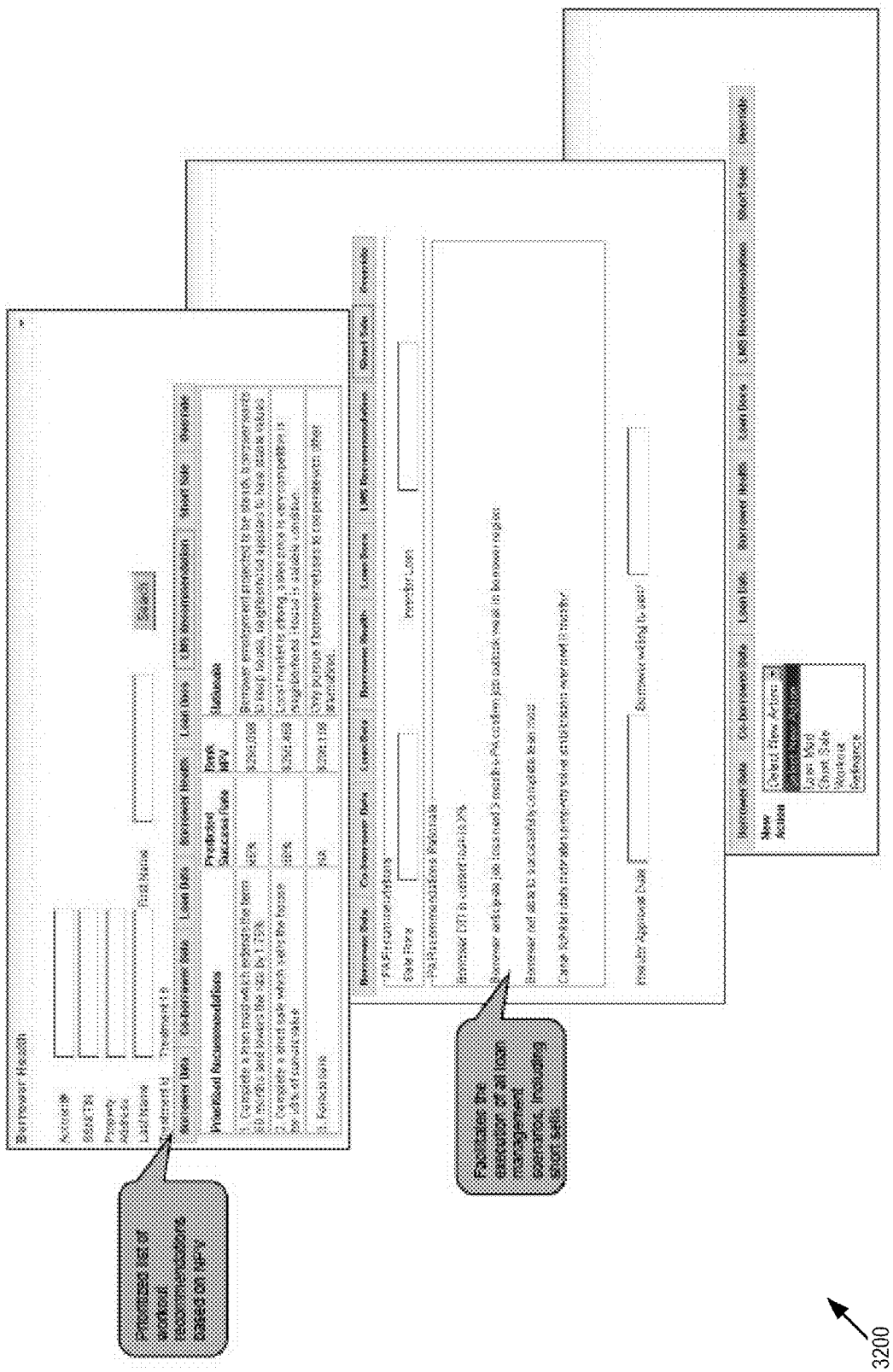
FIG. 32 illustrates a borrower health interface and a remediation recommendations interface.

FIG. 32 illustrates a borrower health interface and a remediation recommendations interface 3200. The borrower health interface may include a prioritized list of workout recommendations based on NPV. The prioritized list of workout recommendations may include a description, a predicted success rate, a bank NPV, and a rationale for each respective one of the workout recommendations. Examples of the description may include "complete a loan mod which extends the term to 60 months and lowers the rate by 1.75%," "complete a short sale which sells the house for 83% of current value," and "foreclose the house." Examples of corresponding rationales may include "borrower employment projected to be steady, borrower wants to keep house, neighborhood appears to have stable values," "local market is strong, sales price is very competitive in neighborhood—house is in salable condition," and "only pursue if borrower refuses to cooperate with other alternatives," respectively. The remediation recommendations interface 3200 may facilitate user selection of one of the respective workout recommendations.

FIG. 33 illustrates an example of customer contact management process components 3300. The LPM system 102 provides customer contact management that initiates targeted customer outreach, early intervention and interactions aimed at keeping borrowers in their homes. The customer contact management of the LPM system 102 may provide, for example: (1) a self-directed borrower portal; (2) phone campaigns; and (3) mass mails and messaging, such as SMS (short message service) texting and emailing. Loan servicers may outsource and/or co-source key default management functions that fall outside of their core business process. Customer contact management may include: segment analysis, BPO support, and specialized tools.

The LPM system 102 include segment analysis instructions configured to (1) design segmented campaigns that maximize contact with the borrower and encourage default resolution actions by the borrower; and (2) create campaigns to target segments of borrowers identified either by the customer via a self directed portal or through the portfolio analyzer results. Borrowers may be contacted according to highly customizable campaign guidelines.

The LPM system 102 may provide BPO support to loan servicers that lack such capabilities by, for example: performing outbound calls to all customers identified for a specific campaign; facilitating the outbound call center to establish contact with borrowers in order to ensure open communication during the default mitigation process. Borrowers may be entered into a campaigns appropriate for to the borrowers' situation.

The LPM system 102 may include advanced campaign management tools, such as (1) self directed customer portal for initial contact and data collection; and (2) ongoing metric monitoring and reporting on campaign success to identify successful strategies and identify trends.

Figure 34:
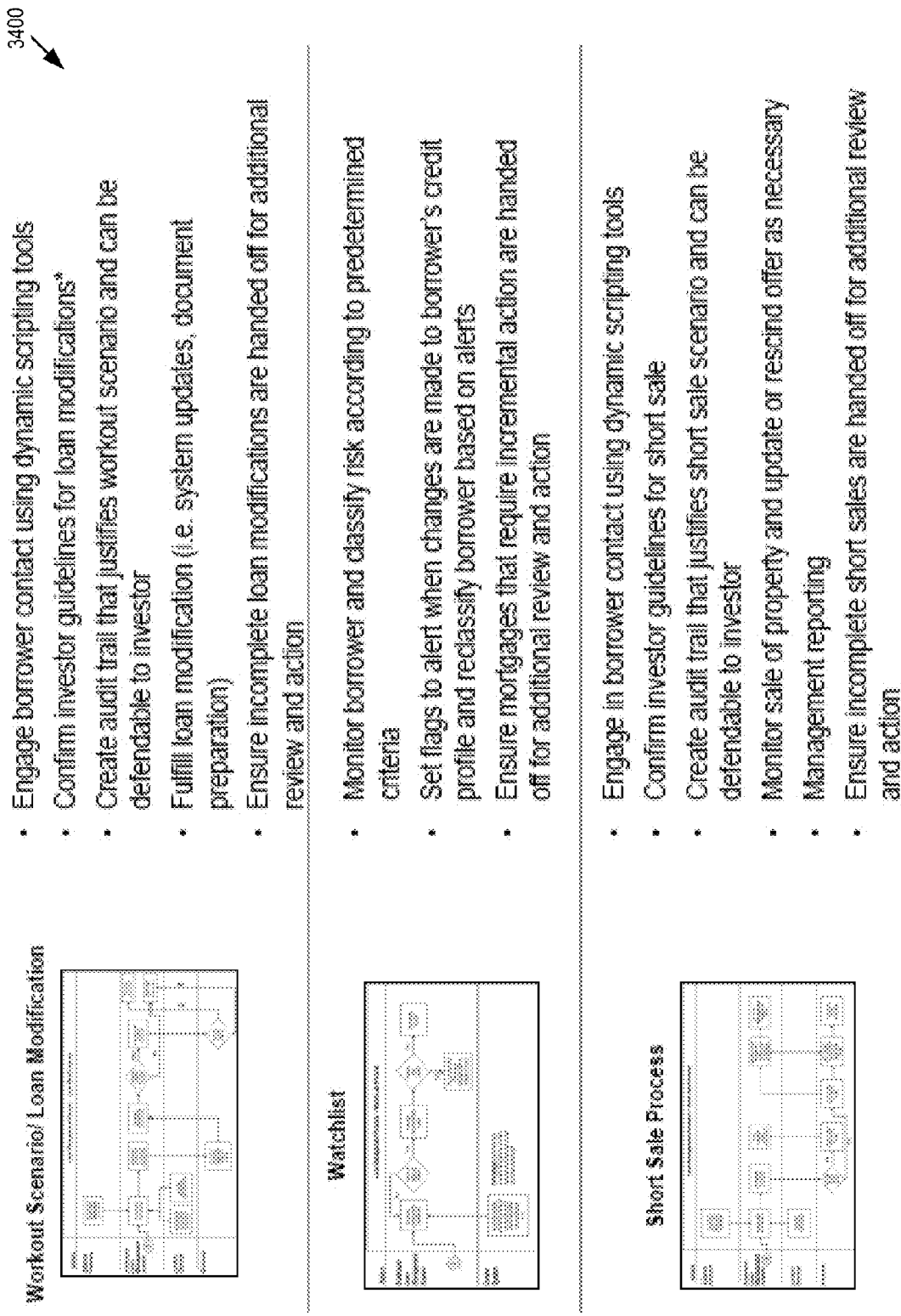
FIG. 34 illustrates example workout scenario, watchlist, and short sale process information.

FIG. 34 illustrates example information for workout scenario/loan modification, watchlist, and short sale process information 3400. See also FIGS. 15, 16, and 17 for example instructions logic to execute workout scenario/loan modification, monitor a borrower watchlist and execute a short sale.

The logic, circuitry, and processing described above may be encoded or stored in a machine-readable or computer-readable medium such as a compact disc read only memory (CDROM), magnetic or optical disk, flash memory, random access memory (RAM) or read only memory (ROM), erasable programmable read only memory (EPROM) or other machine-readable medium as, for examples, instructions for execution by a processor, controller, or other processing device. The medium may be implemented as any device that contains, stores, communicates, propagates, or transports executable instructions for use by or in connection with an instruction executable system, apparatus, or device. Alternatively or additionally, the logic may be implemented as analog or digital logic using hardware, such as one or more integrated circuits, or one or more processors executing instructions; or in software in an application programming interface (API) or in a Dynamic Link Library (DLL), functions available in a shared memory or defined as local or remote procedure calls; or as a combination of hardware and software.

In other implementations, the logic may be represented in a signal or a propagated-signal medium. For example, the instructions that implement the logic of any given program may take the form of an electronic, magnetic, optical, electromagnetic, infrared, or other type of signal. The systems described above may receive such a signal at a communication interface, such as an optical fiber interface, antenna, or other analog or digital signal interface, recover the instructions from the signal, store them in a machine-readable memory, and/or execute them with a processor.

The systems may include additional or different logic and may be implemented in many different ways. A processor may be implemented as a controller, microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instructions may be parts of a single program, separate programs, or distributed across several memories and processors.

What is claimed is:

1. An article of manufacture, comprising:
a computer readable medium; and
instructions stored on the medium that when executed by a processor cause the processor to:
retrieve, into a memory, borrower data, macro economic data and loan servicer portfolio data for a loan servicer, wherein the loan servicer portfolio comprises data for loans to borrowers that the loan servicer services;
analyze, using the loan servicer portfolio data and the macro economic data, the loans and the borrower data to prioritize the borrowers and the loans according to configurable risk threshold values, and
identify an at risk loan based on the analysis, wherein identifying the at risk loan further causes the processor to:
identify a loss mitigation campaign for the borrower from a plurality of loss mitigation campaigns that responsively reduce loss from the at risk loan, the plurality of loss mitigation campaigns including a contact management campaign, wherein the contact management campaign includes a remediation solution for the at risk loan;
recommend the remediation solution for the at risk loan according to the contact management campaign;
monitor updates to the borrower data to determine whether the updated borrower data exceed the configurable risk threshold values; and
execute the remediation solution for the at risk loan, prior to contacting the borrower;
display, using a graphical user interface, a loan servicer portfolio management interface configured to:
display the loan servicer portfolio;
receive user input; and
display the remediation solution.

2. The article of manufacture of claim 1, wherein the remediation solution comprises tasks to minimize costs to modify the loan for the loan servicer, improve future borrower data in order to avoid foreclosing the at risk loan and transform the at risk loan into a performing loan.

3. The article of manufacture of claim 1, wherein the macro economic data comprises real-time:
pricing of mortgages;
rate of unemployment;
rate of underemployment;
property values; and
spreads between agency bonds and U.S. treasury bonds, wherein the agency bonds are bonds issued by U.S. government-sponsored agencies.

4. The article of manufacture of claim 1, wherein when one of the loans is determined to be an at risk loan, the instructions further cause the processor to automatically route the borrower to a loan remediation entity external to the loan servicer, wherein the loan remediation entity is configured to:
execute the contact management campaign configured to maximize contact by the loan remediation entity with the borrower and encourage the borrower to agree to the remediation solution; and
manage execution of the remediation solution.

5. The article of manufacture of claim 1, wherein the instructions further cause the processor to:
calculate a borrower loan portfolio management (LPM) index regulatory component, a LPM index market component, a LPM index loan servicer and investor component, and a borrower personal data component,
analyze results of the executed remediation solution to identify whether the remediation solution was successful;
identify a remediation resolution trend by comparing results of a previously executed remediation solution to the results of the executed remediation solution; and
refine the executed remediation solution into a new remediation solution to recommend to borrowers in the future.

6. The article of manufacture of claim 1, wherein the configurable risk threshold values comprise: homeowner affordability and stability plan threshold values; a regional risk indicator threshold value; and loan servicer specific threshold values.

7. The article of manufacture of claim 1,
wherein the recommended remediation solution conforms to the contact management campaign,
wherein the recommended remediation solution and alternative remediation solutions each comprise a success probability that identifies a probability of transforming the at risk loan into a performing loan, and
wherein the recommended and the alternative remediation solutions are displayed in a ranked order of the success probabilities.

8. The article of manufacture of claim 7, wherein the recommended remediation solution and the alternative remediation solutions comprise tasks from a group consisting of:
performing a sale of a property held by the at risk loan;
forgiving a portion of an amount of the at risk loan;
modifying terms of the at risk loan; and
any combination of performing the sale of the property, forgiving the portion of the at risk loan, and modifying the terms of the at risk loan.

9. A system comprising:
a processor; and
a memory coupled to the processor, the memory comprising instructions that when executed by the processor cause the processor to:
retrieve, into the memory, borrower data, macro economic data and loan servicer portfolio data for a loan servicer, wherein the loan servicer portfolio comprises data for loans to borrowers that the loan servicer services;
analyze, using the loan servicer portfolio data and the macro economic data, the loans and the borrower data to prioritize the borrowers and the loans according to configurable risk threshold values and an at risk loan based on the analysis, and when one of the loans is determined to be an at risk loan:
identify a loss mitigation campaign for the borrower from a plurality of loss mitigation campaigns that responsively reduce loss from the at risk loan, the plurality of loss mitigation campaigns including a contact management campaign, wherein the contact management campaign includes a remediation solution for the at risk loan;
recommend the remediation solution for the at risk loan according to the contact management campaign;
monitor updates to the borrower data to determine whether the updated borrower data exceed the configurable risk threshold values; and
execute the remediation solution for the at risk loan, prior to contacting the borrower;

a graphical user interface configured to display a loan servicer portfolio management interface configured to: display the loan servicer portfolio; receive user input; and display the remediation solution.

10. The system of claim 9, wherein the instructions further cause the processor to store the borrower data, macro economic data and loan servicer portfolio data in a data repository,
wherein the macro economic data comprises:
pricing of mortgages;
rate of unemployment;
rate of underemployment;
property values; and
spreads between agency bonds and U.S. treasury bonds, wherein the agency bonds are bonds issued by U.S. government-sponsored agencies.

11. The system of claim 9, further comprising a loan remediation entity configured to:
execute the contact management campaign configured to maximize contact by the loan remediation entity with the borrower and encourage the borrower to agree to the remediation solution; and
manage execution of the remediation solution.

12. The system of claim 11, wherein the instructions further cause the processor to automatically route the borrower to the loan remediation entity external to the loan servicer when one of the loans is determined to be an at risk loan.

13. The system of claim 9, wherein the instructions further cause the processor to:
analyze results of the executed remediation solution to identify whether the remediation solution was successful;
identify a remediation resolution trend by comparing results of a previously executed remediation solution to the results of the executed remediation solution; and
refine the executed remediation solution into a new remediation solution to recommend to borrowers in the future.

14. The system of claim 9, wherein the recommended remediation solution conforms to the contact management campaign,
wherein the recommended remediation solution and alternative remediation solutions each comprise a success probability that identifies a probability of transforming the at risk loan into a performing loan, and
wherein the recommended and the alternative remediation solutions are displayed in a ranked order of the success probabilities.

15. A method comprising,
retrieving, using a processor into a memory, borrower data, macro economic data and loan servicer portfolio data for a loan servicer, wherein the loan servicer portfolio comprises data for loans to borrowers that the loan servicer services;
analyzing, using the loan servicer portfolio data and the macro economic data, the loans and the borrower data to prioritize the borrowers and the loans according to configurable risk threshold values and identify an at risk loan based on the analysis, wherein identifying the at risk loan further causes the processor to:
identify loss mitigation campaign for the borrower from a plurality of loss mitigation campaigns that responsively reduce loss from the at risk loan, the plurality of loss mitigation campaigns including a contact management campaign, wherein the contact management campaign includes a remediation solution for the at risk loan;
recommend the remediation solution for the at risk loan according to the contact management campaign;
monitor updates to the borrower data to determine whether the updated borrower data exceed the configurable risk threshold values; and
execute the remediation solution;
displaying, using a graphical user interface, the loan servicer portfolio and the remediation solution.

16. The method of claim 15, further comprising:
routing the borrower to a loan remediation entity external to the loan servicer when one of the loans is determined to be an at risk loan;
executing, by the loan remediation entity, the contact management campaign configured to maximize contact by the loan remediation entity with the borrower and encourage the borrower to agree to the remediation solution; and
managing, by the loan remediation entity, the execution of the remediation solution.

17. The method of claim 15, further comprising:
analyzing results of the executed remediation solution to identify whether the remediation solution was successful;
identifying a remediation resolution trend by comparing results of a previously executed remediation solution to the results of the executed remediation solution; and
refining the executed remediation solution into a new remediation solution to recommend to borrowers in the future.

18. The method of claim 15, further comprising:
setting the configurable risk threshold values, including: homeowner affordability and stability plan threshold values; a regional risk indicator threshold value; and loan servicer specific threshold values.

19. The method of claim 15, further comprising
confirming that the recommended remediation solution conforms to the contact management campaign; and
calculating a success probability for the recommended remediation solution and alternative remediation solutions, wherein the success probability identifies a probability of transforming the at risk loan into a performing loan.

20. The method of claim 19, further comprising:
displaying, using the graphical user interface, the recommended and the alternative remediation solutions in a ranked order of the success probabilities.

21. The method of claim 19, further comprising:
performing tasks for the recommended remediation solution and the alternative remediation solutions, including:
performing a sale of a property held by the at risk loan;
forgiving a portion of an amount of the at risk loan;
modifying terms of the at risk loan; and
any combination of performing the sale of the property, forgiving the portion of the at risk loan, and modifying the terms of the at risk loan.

22. An article of manufacture, comprising:
a computer readable medium; and
instructions stored on the medium that when executed by a processor cause the processor to:
retrieve, into a memory, borrower data, macro economic data and loan servicer portfolio data for a loan servicer, wherein the loan servicer portfolio comprises data for loans to borrowers that the loan servicer services;
analyze, using the loan servicer portfolio data and the macro economic data, the loans and the borrower data to prioritize the borrowers and the loans according to configurable risk threshold values;

identify an at risk loan based on the analysis, and for the at risk loan and an associated borrower:

execute a connected series of operations for contacting the borrower, monitor updates to the borrower data in response to the connected series of operations, and in response to determining that the updated borrower data exceed the configurable risk threshold values, execute a remediation solution for the at risk loan;

display, using a graphical user interface, a loan servicer portfolio management interface configured to: display the loan servicer portfolio;

receive user input; and display the remediation solution.

* * * * *